US00RE45252E

(19) United States
(12) Reissued Patent
Ono

(10) Patent Number: US RE45,252 E
(45) Date of Reissued Patent: Nov. 18, 2014

(54) IMAGE FORMING APPARATUS WITH CHANGE UNIT FOR CHANGING TEMPERATURE OF FIXING UNIT AT TIME OF ACTUATING IMAGE FORMING UNIT

(75) Inventor: Kazuaki Ono, Kashiwa (JP)

(73) Assignee: Canon Kabushiki Kaisha, Tokyo (JP)

(21) Appl. No.: 12/904,914

(22) Filed: Oct. 14, 2010

Related U.S. Patent Documents

Reissue of:
(64) Patent No.: 7,437,086
Issued: Oct. 14, 2008
Appl. No.: 11/262,985
Filed: Nov. 1, 2005

(30) Foreign Application Priority Data

Dec. 10, 2004 (JP) ..... 2004-358642

(51) Int. Cl.
*G03G 15/00* (2006.01)
*G03G 15/20* (2006.01)

(52) U.S. Cl.
USPC ..... 399/38; 399/69; 399/321

(58) Field of Classification Search
USPC ..... 399/38, 45, 69, 70, 76, 321; 219/216
See application file for complete search history.

(56) References Cited

U.S. PATENT DOCUMENTS

| | | | |
|---|---|---|---|
| 6,148,163 | A | 11/2000 | Ito |
| 6,751,425 | B2 | 6/2004 | Fujimori et al. |
| 6,952,540 | B2 | 10/2005 | Uchiyama |
| 7,110,691 | B2 | 9/2006 | Saida |
| 2005/0135827 | A1 | 6/2005 | Akita et al. |
| 2006/0127112 | A1 | 6/2006 | Ono |

FOREIGN PATENT DOCUMENTS

| | | | |
|---|---|---|---|
| JP | 63-313182 | | 12/1988 |
| JP | 63-313182 | A | 12/1988 |
| JP | 2-157878 | | 6/1990 |
| JP | 2-157878 | A | 6/1990 |
| JP | 4-44075 | | 2/1992 |
| JP | 4-44075 | A | 2/1992 |

(Continued)

OTHER PUBLICATIONS

Official Letter (English Translation)/Search Report, issued by The Patent Office of the People's Republic of China, on Feb. 1, 2008, in Chinese Application No. 200510119465.X.

(Continued)

*Primary Examiner* — Robert Beatty
(74) *Attorney, Agent, or Firm* — Fitzpatrick, Cella, Harper & Scinto

(57) ABSTRACT

An image forming apparatus [capable of performing] *can perform* an image forming operation together with [temperature rise by heating of] a *heat* fixing [apparatus] *operation* to ensure a good fixability and a [shortest] *short* first print out time [and to prevent loss of] *while minimizing* power consumption [without] *and not over*-burdening a constitutional member of the image forming apparatus (e.g., [life-shortening] *shortening the life* of the constitutional member)[is provided]. The image forming apparatus includes *an image forming unit and* a fixing [apparatus] *unit* for heat-fixing a toner image on a recording material [and a detection member for detecting a toner of a fixing apparatus member and performs simultaneously temperature rise by heating of the fixing apparatus and an image forming operation including a pre-process and an image forming sequence]. [In the image forming apparatus, a start] *A fixing* temperature of [the pre-process and a start temperature of the image forming sequence with respect to] the fixing [apparatus member are] *unit is* made variable depending on whether full-color image formation [is performed] or mono-color image formation is performed.

57 Claims, 13 Drawing Sheets

(56) References Cited

FOREIGN PATENT DOCUMENTS

| | | | |
|---|---|---|---|
| JP | 4-44076 | | 2/1992 |
| JP | 4-44076 | A | 2/1992 |
| JP | 4-44077 | | 2/1992 |
| JP | 4-44077 | A | 2/1992 |
| JP | 4-44078 | | 2/1992 |
| JP | 4-44078 | A | 2/1992 |
| JP | 4-44079 | | 2/1992 |
| JP | 4-44079 | A | 2/1992 |
| JP | 4-44080 | | 2/1992 |
| JP | 4-44080 | A | 2/1992 |
| JP | 4-44081 | | 2/1992 |
| JP | 4-44081 | A | 2/1992 |
| JP | 4-44082 | | 2/1992 |
| JP | 4-44082 | A | 2/1992 |
| JP | 4-44083 | | 2/1992 |
| JP | 4-44083 | A | 2/1992 |
| JP | 4-97382 | A | 3/1992 |
| JP | 4-140765 | | 5/1992 |
| JP | 4-140765 | A | 5/1992 |
| JP | 7-114276 | | 5/1992 |
| JP | 4-204980 | | 7/1992 |
| JP | 4-204980 | A | 7/1992 |
| JP | 4-204981 | | 7/1992 |
| JP | 4-204981 | A | 7/1992 |
| JP | 4-204982 | | 7/1992 |
| JP | 4-204982 | A | 7/1992 |
| JP | 4-204983 | | 7/1992 |
| JP | 4-204983 | A | 7/1992 |
| JP | 4-204984 | | 7/1992 |
| JP | 4-204984 | A | 7/1992 |
| JP | 05-066691 | A | 3/1993 |
| JP | 5-113705 | A | 5/1993 |
| JP | 7-114276 | A | 5/1995 |
| JP | 7-287474 | A | 10/1995 |
| JP | 08-076636 | A | 3/1996 |
| JP | 8-123242 | A | 5/1996 |
| JP | 9-44014 | | 2/1997 |
| JP | 9-44014 | A | 2/1997 |
| JP | 9-237675 | | 9/1997 |
| JP | 9-237675 | A | 9/1997 |
| JP | 11-212389 | | 8/1999 |
| JP | 11-212389 | A | 8/1999 |
| JP | 2001-318544 | | 11/2001 |
| JP | 2001-318544 | A | 11/2001 |
| JP | 2001-356625 | | 12/2001 |
| JP | 2001-356625 | A | 12/2001 |
| JP | 2002-278355 | A | 9/2002 |
| JP | 2002-311757 | A | 10/2002 |
| JP | 2003-57993 | | 2/2003 |
| JP | 2003-057993 | A | 2/2003 |
| JP | 2003-156968 | A | 5/2003 |
| JP | 2003-186343 | | 7/2003 |
| JP | 2003-186343 | A | 7/2003 |
| JP | 2004-145085 | A | 5/2004 |
| JP | 2004-145086 | A | 5/2004 |
| JP | 2004-170669 | A | 6/2004 |
| JP | 2004-246212 | A | 9/2004 |

OTHER PUBLICATIONS

Notification of Reasons for Rejection dated Jan. 11, 2011, in Japanese Application No. 2004-358642.

IMAGE FORMING APPARATUS WITH CHANGE UNIT FOR CHANGING TEMPERATURE OF FIXING UNIT AT TIME OF ACTUATING IMAGE FORMING UNIT

Matter enclosed in heavy brackets [ ] appears in the original patent but forms no part of this reissue specification; matter printed in italics indicates the additions made by reissue.

FIELD OF THE INVENTION AND RELATED ART

The present invention relates to an image forming apparatus utilizing electrophotography, particularly an image forming apparatus such as a copying machine, a printer, a facsimile apparatus, etc.

In recent years, in an image forming apparatus such as a laser beam printer or the like, needs for colorization have grown. [Ass] *As* a color image forming method, it has been said that electrophotography is excellent in terms of an image forming speed or the like.

In the electrophotographic-type image forming apparatus, realization of size reduction, higher functionality, colorization, and speeding up have been promoted. On the other hand, demands for energy saving, environmental [measure] *measures*, and the like have been increasing, so that various image forming apparatuses have been proposed in order to meet the demands.

In order to achieve the energy saving of the color image forming apparatus, it is necessary to reduce power consumption of a fixing apparatus which consumes a largest amount of power among constitutional members of the image forming apparatus. For this reason, in order to reduce the power consumption of the fixing apparatus, reduction in warm-up time and reduction in power consumption during standby (during non-image forming operation) are most effective.

In order to reduce the power consumption during standby, the power consumption of the fixing apparatus during standby may preferably be removed or a fixing member temperature during standby (hereinafter referred to as a "standby temperature") may preferably be decreased as low as possible.

However, in the case where heat capacities of a fixing member and a pressing member of the fixing apparatus are large, a warm-up time required for increasing a temperature of the fixing member from a standby state temperature to a fixable state temperature is prolonged. As a result, a time from start of copying or printing to image formation (hereinafter referred to as a "first print out time (FPOT)" is also prolonged, so that usability has become poor.

For this reason, [there] *it* has been desired to provide an easy-to-use image forming apparatus having a short warm-up time and a short FPOT even when the power consumption during standby is removed or the standby temperature is decreased by lowering the heat capacity of the fixing member or the pressing member of the fixing apparatus.

However, in a conventional and ordinary image forming apparatus, an image forming operation is started only after the fixing member temperature of the fixing apparatus reaches a fixable temperature, so that such a problem that it takes a very long time from turning-on of power or standby state to formation of an image has arisen.

Here, the start of image forming operation means, e.g., start of scanner rotation for increasing a rotation speed of a polygon mirror, which reflects laser light from an exposure apparatus and is rotated at high speed by a scanner motor, to a predetermined rotation speed; start of photosensitive drum rotation; start of charging bias application for applying a predetermined bias to a charging roller; start of developing operation (start of developing roller rotation or start of developing bias application for applying a predetermined bias to the developing roller); start of exposure by the exposure apparatus after the rotation speed of the polygon mirror reaches the predetermined rotation speed and the surface of the photosensitive drum is placed in a state capable of being exposed to light; start of recording material conveyance for being synchronized with timing of the exposure start of the exposure apparatus; etc.

Japanese Laid-Open Patent [Applications] *Application* (JP-A) Nos. Hei 4-140765 and 2003-57993 have proposed such an image forming apparatus that an image forming operation is started before a fixing member temperature of a fixing apparatus reaches a fixable temperature.

Further, JP-A 2003-186343 has proposed an image forming apparatus in which a temperature rise speed (a time change rate per unit temperature or a temperature change rate per unit time) of a fixing member is detected and such a fixing member temperature that it reaches a fixable temperature at the time when a recording material reaches a fixing nip portion is predicted to start an image forming operation at the predicted fixing member temperature.

However, in the image forming apparatus proposed in JP-A Hei 4-140765 or JP-A 2003-57993, in the case where a power-supply voltage is lowered to a lower-limit value, the fixing member temperature cannot be increased to the fixable temperature when the recording material reaches the fixing nip portion, so that there is a possibility that such a problem of poor fixability that a deposition force of toner exerted onto the recording material is lowered has arisen.

Further, in the image forming apparatus proposed in JP-A 2003-186343, in the case where it is a color image forming apparatus or an image forming apparatus having a slow recording material conveyance speed (process speed), an image forming operation is required to be started at a low fixing member temperature. For this reason, an error in temperature rise speed is caused to occur between a predicted temperature rise speed and an actual temperature rise speed, so that there is a possibility that the problem of poor fixability has arisen.

Further, in the color image forming apparatus, when the image forming operation is started at the same fixing member temperature during both of full-color image formation and mono-color image formation, the image forming operation is started unnecessarily early during the mono-color image formation. As a result, a photosensitive drum is rotated unnecessarily early, so that there have arisen such a problem that a surface layer of the photosensitive drum is abraded to shorten the life of the photosensitive drum and a problem of loss of power consumption.

More specifically, in the case of a so-called tandem-type intermediary transfer type color image forming apparatus, during the full-color image formation, four image forming units are required to be operated but, e.g., during white/black image formation (such as black image formation) as the mono-color image formation, it is sufficient to operate only a black image forming unit located most downstream in a movement direction of an intermediary transfer member. As a result, it is possible to delay the start of the image forming operation at least by a time corresponding to a distance between a photosensitive drum of the black image forming unit and an image forming unit (e.g., [an] *a* yellow image forming unit) located most downstream in the movement direction of the intermediary transfer member. However, in such a constitution that the image forming operation is started at the same fixing member temperature during both of the full-color image formation and the mono-color image formation, even during the mono-color image formation, the image forming operation is required to be started at a fixing member temperature suitable for the full-color image formation. As a result, during the mono-color image formation, the image forming operation is [early] started *early* unnecessarily.

Further, in a so-called one drum-type color image forming apparatus, the problems described above are particularly noticeable. More specifically, during the full-color image formation, a long time for multiple-transferring four color toner image onto an intermediary transfer member or directly effecting the multiple transfer onto the recording material is required. On the other hand, during the mono-color image formation, only a short time for transferring a single color toner image onto the intermediary transfer member or directly effecting the transfer of the single color toner image onto the recording material is required. However, in the case of such a constitution that the image forming operation is started at the same fixing member temperature during both of the full-color image formation and the mono-color image formation, the fixing member temperature at the time of start of the image forming operation is determined so that it reaches the fixable temperature in a short time for the case of the mono-color image formation, so that loss of power consumption of the fixing apparatus is caused to occur for a long time for the case of the full-color image formation.

SUMMARY OF THE INVENTION

An object of the present invention is to provide an image forming apparatus capable of improving the life of an image forming means.

Another object of the present invention is to provide an image forming apparatus capable of suppressing loss of power consumption in the image forming means.

According to an aspect of the present invention, there is provided an image forming apparatus *including*:

image forming means for forming a toner image of a plurality of colors on a recording material;

fixing means for heat-fixing the toner image formed on the recording material;

detection means for detecting a temperature of the fixing means;

actuation means for actuating the image forming means depending on a temperature of the fixing means detected when image formation is started; and change means for changing actuation timing of the image forming means depending on whether a toner image is formed in the plurality of colors or a predetermined single color.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Embodiment 1

Embodiment 1 of the present invention will be described with reference to FIGS. 1-11.

(1) Color Image Forming Apparatus

An electrophotographic-type color image forming apparatus is classified into an image forming apparatus of a one drum-type wherein a developing apparatuses for a plurality of colors are provided around a single photosensitive member and an image forming apparatus of a tandem-type wherein a plurality of photosensitive members are independently provided with a developing apparatus. Further, of these color image forming apparatuses, those of an intermediary transfer-type have become main stream. This intermediary transfer type has the advantages that all kinds of a transfer materials can be used and that it is excellent in color registration (less color deviation). Further, in order to met ecology, a copying machine or a printer using such a system that an amount of waste toner is decreased simultaneously with a decrease in amount of consumed toner by recovering transfer residual toner to be reutilized (cleaner-less system) has been put into practical use. In addition, by adopting such a cleaner-less system, the image forming apparatus can be advantageously reduced in size.

Figure 1:
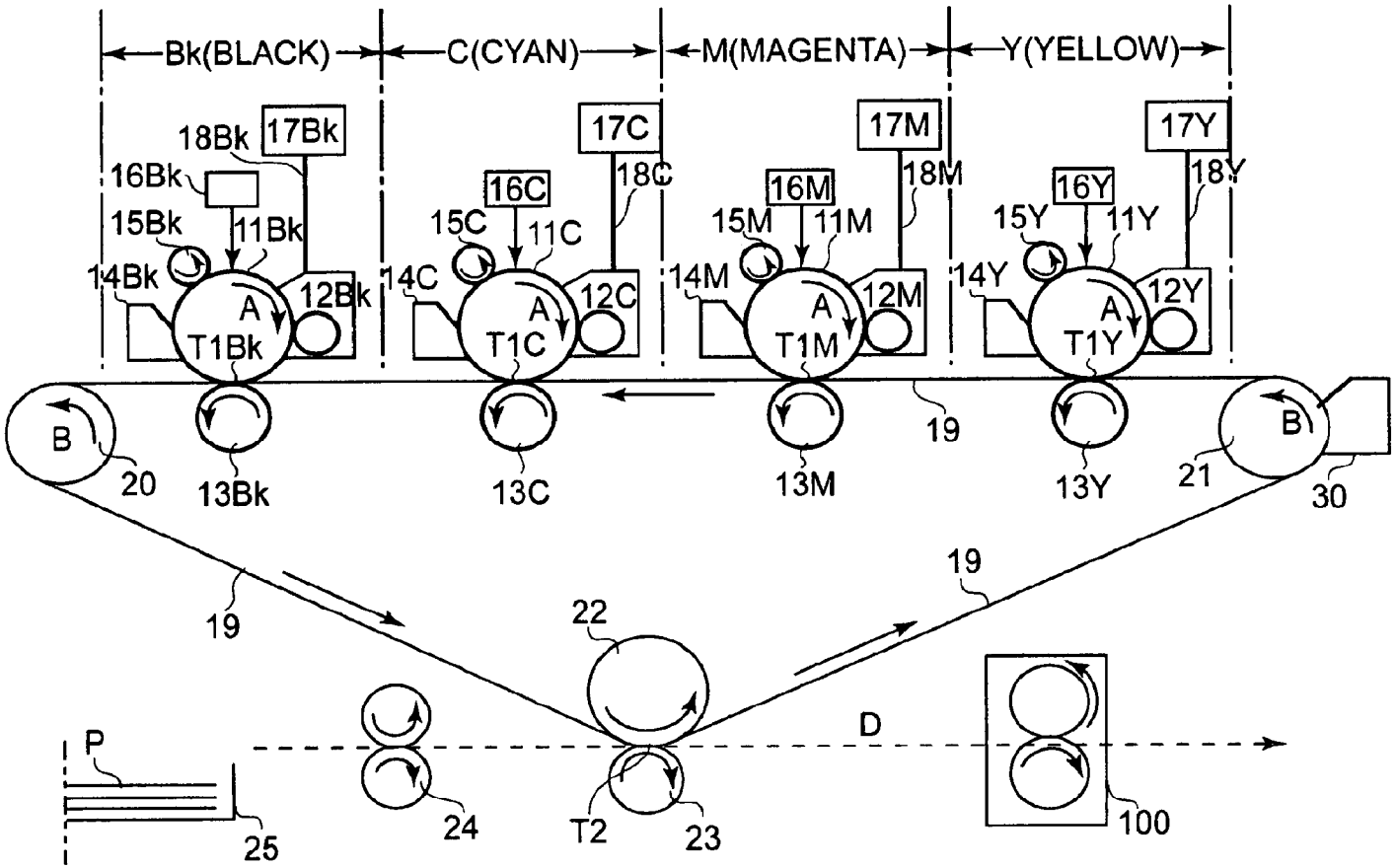
FIG. 1 is a schematic sectional view showing an embodiment of an image forming apparatus of a tandem-type intermediary transfer-type according to Embodiment 1 of the present invention.

FIG. 1 is a schematic constitutional view of a color image forming apparatus in this embodiment. This apparatus is a tandem-type electrophotographic color image forming apparatus of an intermediary transfer type.

This color image forming apparatus includes four image forming units for forming toner images in different four colors of Y (yellow), M (magenta), C (cyan), and Bk (black). An endless intermediary transfer belt 19 as an intermediary transfer member is disposed so that the four image forming units are disposed in series on the belt.

The four image forming units have the same constitution and thus in the following description, explanation for a constitution of a yellow image forming unit will be made as a representative example.

A cylindrical electrophotographic photosensitive member 11Y, as an image-bearing member, having a surface layer of an organic photoconductor (OPC) (hereinafter referred to as a "photosensitive drum") is rotationally driven in an indicated arrow A. A charging roller 15Y for electrically charging the surface of the photosensitive drum 11Y uniformly is supplied with a predetermined bias (voltage) and is rotated in contact with the photosensitive drum 11Y by the rotation of the photosensitive drum 11Y, thus electrically charging the surface of the photosensitive drum 11Y. The electrically charged photosensitive drum 11Y is exposed to exposure light (laser light or the like) by an exposure apparatus 16Y, whereby an electrostatic latent image corresponding to a color separation image of an input original is formed on the surface of the photosensitive drum 11Y. The electrostatic latent image is developed with electrically charged toner by a developing roller of a developing apparatus 12Y to be formed in a toner image corresponding thereto on the surface of the photosensitive drum 11Y. The toner image on the photosensitive drum 11Y is primary-transferred onto an intermediary transfer belt 19, which is rotated at the substantially same speed as the photosensitive drum 11Y at a primary transfer nip portion (primary transfer portion), by a primary transfer roller 13Y to which a predetermined bias is applied. Primary transfer residual toner remaining on the photosensitive drum 11Y after the primary transfer of the toner image onto the intermediary transfer belt 19 is performed is recovered by a photosensitive drum cleaning apparatus 14Y provided with a blade, a brush, etc. The photosensitive drum 11Y from which the primary transfer residual toner is removed is again electrically charged uniformly by the charging roller 15Y and repetitively subjected to subsequent image formation. A toner supply apparatus 17Y successively supplies toner to the developing apparatus 12Y through a supply path 18Y.

The intermediary transfer belt 19 is extended around a drive roller 20, a supporting roller 21, and a back-up roller 22 and is rotationally driven in contact with photosensitive drums 11Y, 11M, 11C and 11Bk of the four image forming units Y, M, C and Bk in an indicated arrow B by rotation of the drive roller 20. The intermediary transfer belt 19 is interposed between the primary transfer rollers 13Y, 13M, 13C and 13Bk and the photosensitive drums 11Y, 11M, 11C and 11Bk to form primary transfer nip portions T1Y, T1M, T1C and T1Bk between the intermediary transfer belt 19 and the photosensitive drums 11Y, 11M, 11C and 11Bk.

In the case where a full-color mode is selected (full-color image formation), the above described image forming operation is performed by the respective (four) image forming units Y, M, C and Bk and four color toner images consisting of a yellow toner image, a magenta toner image, a cyan toner image, and a black toner image which are formed on the photosensitive drums 11Y, 11M, 11C and 11Bk, respectively, are successively transferred onto the intermediary transfer belt 19 in a multiple transfer manner. Incidentally, the order of transferred color toner images is not particularly limited to that described above but may be an arbitrary order depending on the image forming apparatus used.

The multiple-transferred toner image on the intermediary transfer belt 19 is simultaneously secondary-transferred onto a recording material (transfer material) P, which is supplied to a secondary transfer nip portion T2 created between a secondary transfer roller 23 and the intermediary transfer belt 19 supported by the back-up roller 22 at a predetermined control timing, at the secondary transfer nip portion T2 by the secondary transfer roller 23 to which a predetermined bias is applied. The recording material P onto which the toner image is secondary-transferred is conveyed in a conveyance path D to be introduced into a fixing apparatus 100 in which the toner image on the recording material is pressed and heated. As a result, on the recording material, a full-color toner image is fixed.

Further, at the secondary transfer nip portion T2, secondary transfer residual toner remaining on the intermediary transfer belt 19 after the secondary transfer of the toner image is transferred onto the recording material P is performed is recovered by an intermediary transfer belt cleaning apparatus 30 provided with a blade, a brush, or the like. The intermediary transfer belt 19 from which the secondary transfer residual toner is removed is subjected repetitively to primary transfer for subsequent image formation.

Further, in the case of a mono-color mode of a black single color (mono-color image formation) or two or three color modes, image formation with respect to an associated photosensitive drum is performed by an image forming unit for a necessary color (while rotating the photosensitive drum(s) of unnecessary image forming unit(s) in idle), so that a resultant toner image is primary-transferred onto the intermediary transfer belt 19 at the primary transfer nip portion T1 and then is secondary-transferred onto the recording material P at the secondary transfer nip portion T2. Thereafter, such an operation that the recording material P is introduced into the fixing apparatus 100.

(2) Fixing Apparatus

As the fixing apparatus in the image forming apparatus, a roller heating-type fixing apparatus is generally adopted. This roller heating-type fixing apparatus includes a fixing (fixation) roller as a fixing (fixation) member, which comprises a cylindrical core metal of aluminum or iron containing therein a halogen heater as a heating source and comprises a heat-resistant release layer coated on the cylindrical core metal, and includes a pressing (pressure) roller as a pressing (pressure) member comprising a core metal, a heat-resistant elastic layer coated on the core metal, and a heat-resistant release layer coated on the elastic layer. Between these fixing roller and pressing roller, a fixing nip portion is formed. At the fixing nip portion, both of the fixing roller and the pressing roller are rotated to press and heat the toner image while conveying the recording material P, whereby the toner image is fixed on the recording material P.

Particularly, as the fixing roller of the fixing apparatus in the color image forming apparatus, a fixing roller comprising a cylindrical core metal, a heat-resistant elastic layer coated on the core metal, and a heat-resistant release layer coated on the elastic layer is adopted from the viewpoint of uniformity in image gloss, etc. This is because the fixing roller surface cannot follow an unevenness of toner on the recording material to fail to melt the toner uniformly, thus causing a minute irregularity in gloss to occur in the case where the heat-resistant elastic layer is not formed in the fixing roller but on the other hand, in the case where the fixing roller is provided with the heat-resistant elastic layer, the fixing roller surface follows the unevenness of the toner on the recording material to uniformly melt the toner, thus preventing the occurrence of the minute irregularity in gloss. In such a constitution that oil is applied to both of the fixing roller and the pressing roller to prevent toner deposition on the rollers, the heat-resistant release layer is omitted and only the heat-resistant elastic layer is coated on the core metal with respect to the fixing roller and the pressing roller in some cases.

Further, in order to meet recent demands for energy saving and reduction in warm-up time (quick start), fixing apparatuses of a pressing belt heating-type and a fixing belt heating-type have been put into practical use.

The pressing belt heating-type fixing apparatus includes a fixing (fixation) roller as a fixing (fixation) member, which comprises a cylindrical thin core metal of aluminum or iron containing therein a halogen heater and comprises a heat-resistant elastic layer and a heat-resistant release layer which are successively coated on the cylindrical core metal, and includes a pressing (pressure) belt as a pressing (pressure) member containing therein a pressing pad. Between these fixing roller and pressing belt, a fixing nip portion is formed. At the fixing nip portion, both of the fixing roller and the pressing belt are rotated to press and heat the toner image while conveying the recording material P, whereby the toner image is fixed on the recording material P.

Further, the fixing belt heating type fixing apparatus is constituted by interposing a fixing belt as a fixing member between a ceramic heater as a heating source and a pressing roller as a pressing member.

Between these fixing belt and pressing roller, a fixing nip portion is formed. At the fixing nip portion, both of the fixing belt and the pressing roller are rotated to press and heat the toner image while conveying the recording material P, whereby the toner image is fixed on the recording material P.

Further, in recent years, as one of the fixing belt heating-type fixing apparatuses, a fixing apparatus of an electromagnetic induction heating type in which an electroconductive belt itself is caused to generate heat has been proposed. In the fixing apparatus of this type, the fixing belt itself or an electroconductive member disposed close to the fixing belt is caused to generate eddy-current, thus being caused to generate heat by Joule heat. In the electromagnetic induction heating-type fixing apparatus, it is possible to cause the fixing belt itself as the fixing member to generate heat, so that heat energy can be efficiently utilized. As a result, the fixing apparatus has the advantage of improved energy saving.

Compared with the roller heating-type fixing apparatus, such a pressing belt heating-type fixing apparatus or the fixing belt heating-type fixing apparatus utilizing the heater or electromagnetic induction heating can efficiently utilize heat energy from the heating source since heat capacities of the thin fixing roller or fixing belt as the fixing member and the pressing belt as the pressing member are very small. For this reason, it is possible to realize quick start capable of shortening a warm-up time which is a time from power-on or a sleep state of the image forming apparatus to an image formable state thereof or capable of making the warm-up time zero. Further, by the quick start, it is not necessary to preliminarily heat the fixing member during standby other than during the image formation, so that power consumption of the image forming apparatus can be reduced to permit energy saving.

The quick start fixing apparatus may preferably have a rise time, required from start of temperature rise of the fixing apparatus member under heating to completion of the temperature rise to a predetermined fixing temperature, of not more than 60 sec., more preferably not more than 30 sec. in view of a standard under energy-saving laws.

Figure 2:
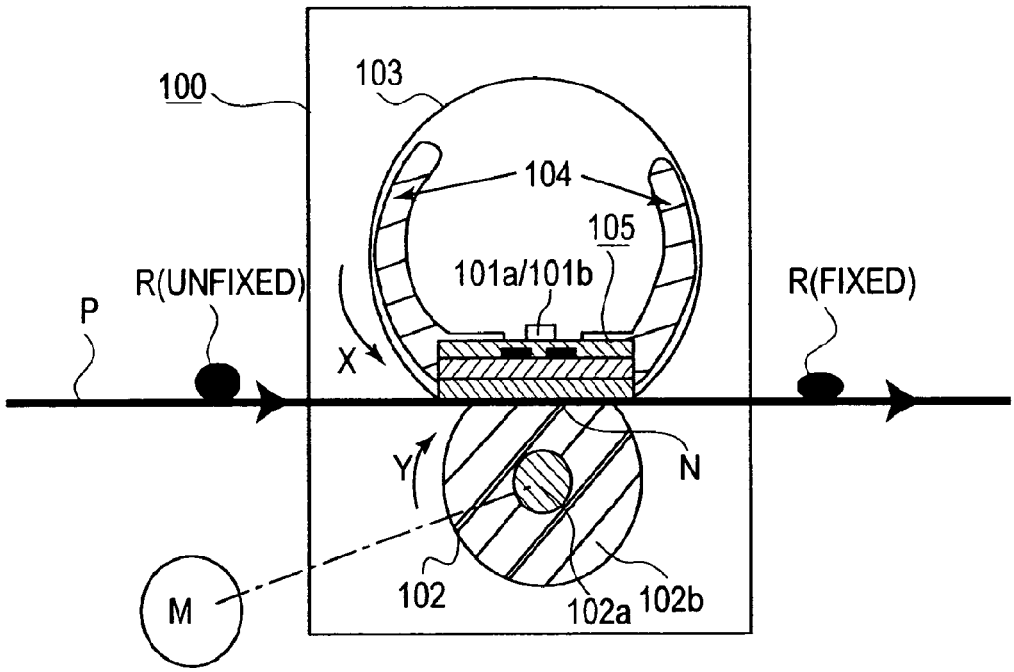
FIG. 2 is a schematic sectional view showing an embodiment of a fixing apparatus used in Embodiment 1.

FIG. 2 is a schematic constitutional view (cross-sectional view) of the fixing apparatus 100 in this embodiment. The fixing apparatus 100 is of a fixing belt heating-type (film heating-type) as described in JP-A Sho 63-313182, Hei 2-157878, Hei 4-44075 to Hei 4-44-83, Hei 4-204980 to Hei 4-204984, etc.

The fixing apparatus 100 includes a ceramic heater 105 as the heating source; a fixing belt 103 as the fixing member; a pressing roller 102 as the pressing member; first and second thermistors 101a and 101b, for detecting a temperature of the heater 105, as detection means for detecting a fixing apparatus member temperature; and a holder 104 for supporting the heater 105 and functioning as a guide to rotational movement of the fixing belt 103.

Figure 4:
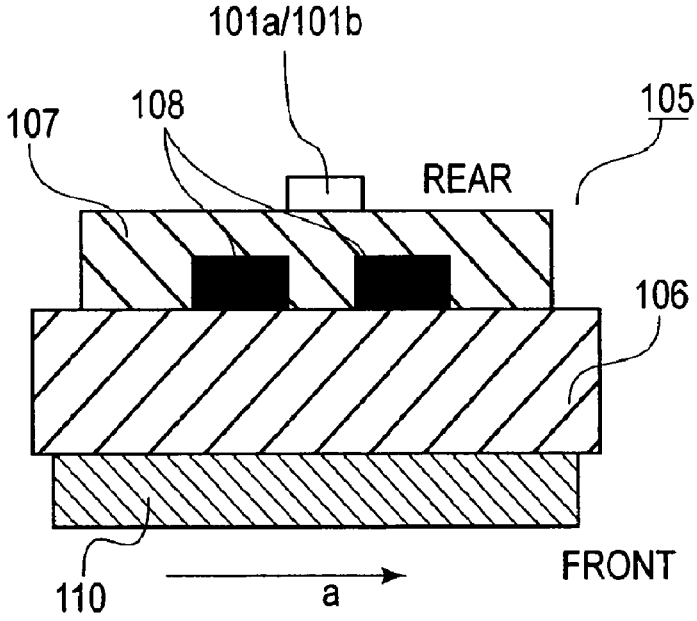
FIG. 4 is a schematic sectional view showing an embodiment of a heater used in Embodiment 1.
Figure 6:
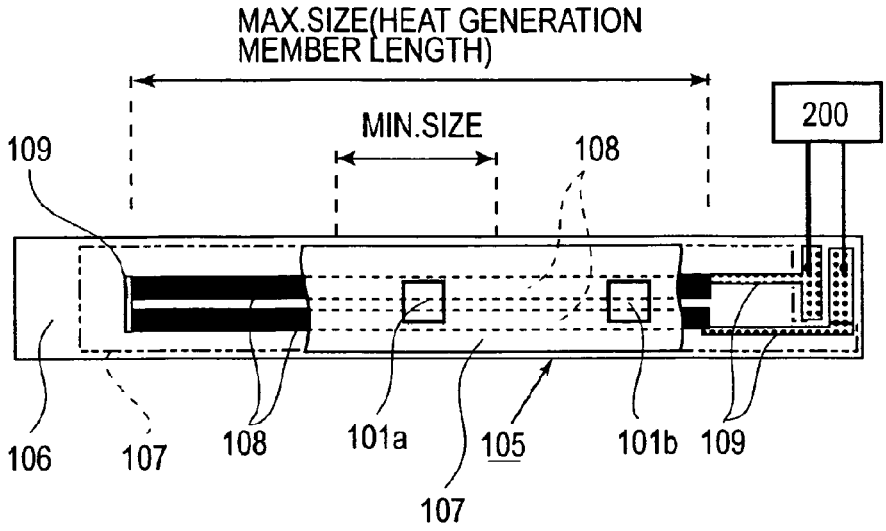
FIG. 6 is a schematic view of the heater used in Embodiment 1 at a side opposite to the fixing belt.
Figure 7:
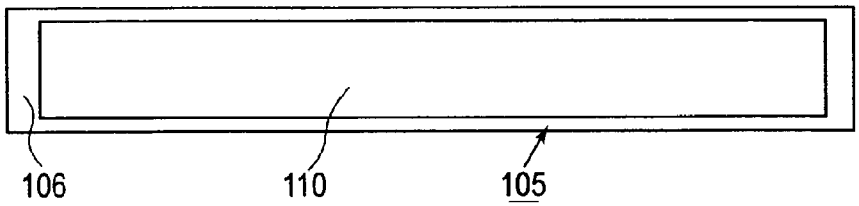
FIG. 7 is a schematic view of the heater used in Embodiment 1 at a fixing belt side.

FIG. 4 is a schematic enlarged cross-sectional view showing a constitution of the heater 105; FIG. 6 is a schematic plan view, as a partially perspective view, showing the heater 105 at a side (rear side) opposite from the fixing belt 103 side (belt sliding surface side); and FIG. 7 is a schematic plan view showing the heater 105 at the fixing belt 103 side (belt sliding surface side or front side).

The heater 105 is an elongated planar heating member which has a low heat capacity and extending in a longitudinal direction perpendicular to a movement direction a of the fixing belt 103 and the recording material P.

The heater 105 includes a heater substrate 106 principally comprising ceramics such as alumina ($Al_2O_3$), aluminum nitride (AlN), etc. In this embodiment, as the heater substrate 106, a substrate of AlN having a thickness of a 7 mm, a width of 12 mm, a length of 280 mm, and a heat conductivity of 100 W/(m.K).

On the heater substrate 106 at the side opposite to the fixing belt sliding surface side (front side), two resistance heating elements 108 of an electrical resistance material such as $TaSiO_2$, AgPd, $Ta_2N$, $RuO_2$, or nichrome are formed each in a thickness 20 μm, a length of 230 mm, and a width of 2 mm so that it is fold back with a spacing of 1 mm, and an electroconductive pattern 109 of an electroconductive material for supplying power to the resistance heating elements 108 and coated by screen printing, followed by baking. On these resistance heating elements 108 and electroconductive pattern 109, a glass layer 107 is coated as an insulating layer and a protective layer.

On the fixing belt sliding surface side (front side) of the heater substrate 106, a polyimide (PI) layer 110 principally comprising polyimide is coated so as to cover a fixing belt width in order to improve sliding properties of the fixing belt 103.

The fixing belt 103, as shown in FIG. 2, has an inner circumferential length somewhat longer than imaginary outer circumferential length of the holder 104, so that the fixing belt 103 is externally engaged in the holder 104 under no tension.

Figure 3:
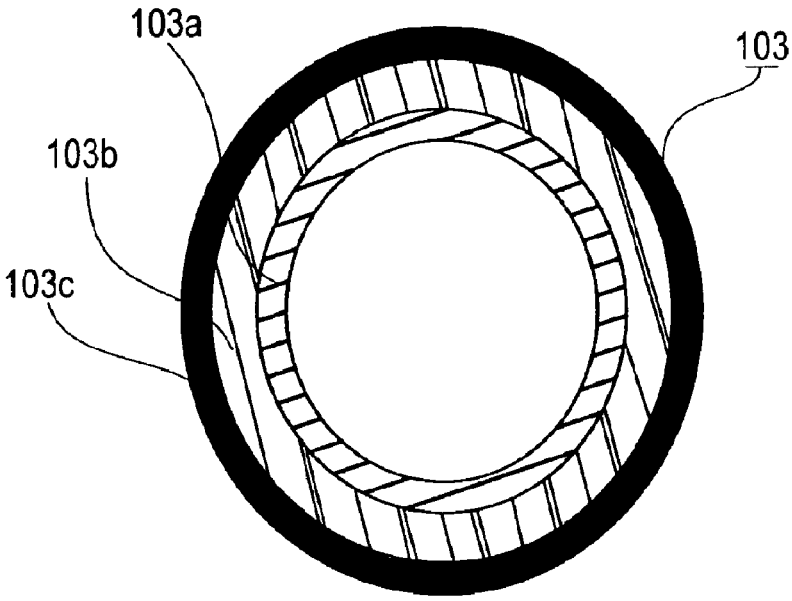
FIG. 3 is a schematic sectional view showing an embodiment of a fixing belt used in Embodiment 1.

FIG. 3 is a schematic sectional views showing a layer constitution of the fixing belt 103. The fixing belt 103 is designed to have a low heat capacity in order to improve quick start performance. In this embodiment, the fixing belt 103 is prepared by applying coating of a 300 μm-thick heat-resistance elastic layer 103b of silicone rubber on a cylindrical base layer 103a of SUS, as a fixing belt support, having a thickness of 40 μm and an inner diameter of 30 mm and further applying coating of a 30 μm-thick heat-resistant release layer 103c of PFA tube on the elastic layer 103b.

The fixing belt 103 may have a single-layer structure as an endless belt-like member principally comprising a heat-resistant material such as PTFE, PFA, FEP, or the like and having a thickness of not more than 200 μm, more preferably about 20-80 μm, or a plural-layer structure prepared by coating an outer peripheral surface of an endless belt-like member as a base layer principally comprising a heat-resistant resinous material, such as polyimide, polyamideimide, PEEK, PES, or PPS or a metal material such as SUS, with an endless belt-like member as the heat-resistant release layer principally comprising PTFE, PFA, FEP, etc.

In this embodiment, however, as described above, the fixing belt 103 includes the base layer 103a of the metal material of SUS having a higher heat conductivity than the heat-resistant resinous material of polyimide or the like in order to improve the quick start performance and includes the heat-resistant elastic layer as the coating of the base layer 103a in order to improve uniformity of image gloss.

The pressing roller 102 is an elastic roller and lowered in hardness by providing a heat-resistant elastic layer 102b of silicone rubber or fluorine-containing rubber on a core metal 102a. In order to improve surface properties and releasability with respect to toner R, at an outer peripheral surface of the elastic layer 102b, a fluorine-containing resinous layer of PTFE, PFA or FEP may be disposed. In this embodiment, a 8 mm-dia. core metal 102a is coated with a heat-resistant elastic layer 102b of silicone rubber, which is further coated with a 50 μm thick tube-like heat-resistant release layer, thus preparing a 25 mm-dia. pressing roller 102.

The fixing belt 103 and the heater 105 are pressed by the pressing roller 102 and between the fixing belt 103 and the pressing roller 102 which are mutually abutted against each other under pressure, the fixing nip portion N through which a recording material P carrying thereon an unfixed toner image is passed.

Further, in this embodiment, the pressing roller 102 is rotationally driven in a clockwise direction of an indicated arrow Y as shown in FIG. 2 by applying a driving force from a driving mechanism M disposed outside the fixing apparatus 100 to the pressing roller 102. The fixing belt 103 is supplied with a rotational force due to a frictional force created between the pressing roller 102 and the fixing belt 103 at the fixing nip portion N by the rotational drive of the pressing roller 102. As a result, the fixing belt 103 is placed in a rotation state in which it is rotated around the holder 104 at the substantially same peripheral speed as the pressing roller 102 in a counterclockwise direction of an indicated arrow X while being slided in contact with the heater 105 at its inner peripheral surface at the fixing nip portion N (pressing roller drive method).

Accordingly, the unfixed toner image is melted by heating with the heater 105 under pressure while the recording material P which is started to enter the fixing nip portion N is conveyed and interposed between the fixing belt 103 and the pressing roller 102, thus being fixed on the recording material P as a fixed image.

Power supply control of the resistance heating element 108 will be described with reference to FIGS. 5 and 6.

Figure 5:
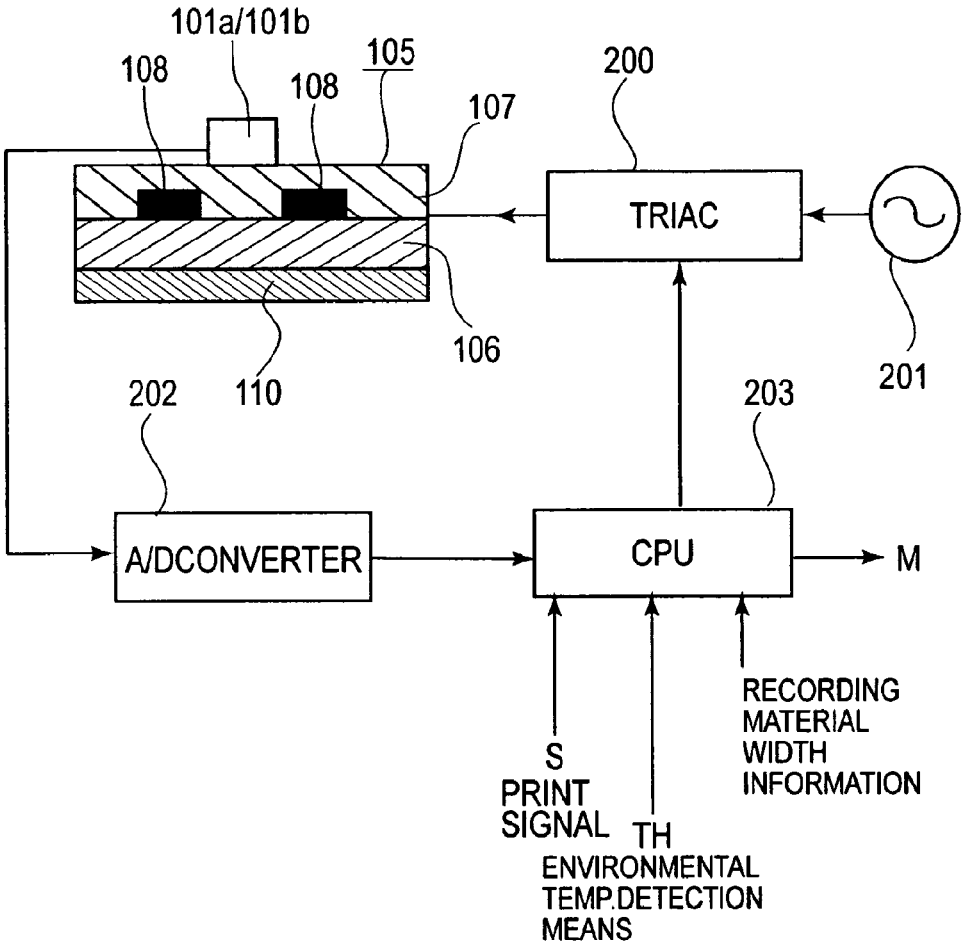
FIG. 5 is a schematic view showing a power supply control circuit with respect to the heater used in Embodiment 1.

FIGS. 5 and 6 are schematic views showing a power supply path from a commercial power source 201 to the resistance heating element 108. The resistance heating element 108 is supplied with power from the commercial power source 201 through a triac 200, and the power supply is controlled by a central processing unit (CPU) 203 as a power supply control means.

The first thermistor (main thermistor) 101a as the temperature detection means for detecting a temperature of the heater 105 is disposed, as shown in FIG. 6, at a rear portion of the heater corresponding to a portion within a sheet-passing area of a recording material having an available minimum sheet-passing size in the fixing apparatus, and the second thermistor (sub-thermistor) 101b is disposed at a rear portion of the heater located close to an end portion of a sheet-passing area of a recording material having an available maximum sheet-passing size in the fixing apparatus. The maximum sheet-passing size substantially corresponds to a length of the resistance heating element 108.

Information (analog information) on the heater temperatures detected by the first and second thermistor 101a and 101b is converted into digital information by an A/D converter 202 to be inputted into the CPU 203.

The CPU 203 compares the temperature information of the heater 105 inputted from the first thermistor 101a with a predetermined target temperature and based on a difference therebetween, it effects PID (proportional, integral, and differential) control of power supplied from the commercial power source 201 to the resistance heating element 108 via the triac 200 so that the temperature of the heater 105 is a predetermined fixing temperature, thus controlling the surface temperature of the fixing belt 103 so that it is the predetermined fixing temperature. Accordingly, the first thermistor 101a is a temperature-control thermistor for controlling the temperature of the heater 105 so as to be the fixing temperature.

The CPU 203 monitors the temperature information of the heater 205 every predetermined period of time and corrects power supplied to the resistance heating element 108 for each predetermined period of time.

In this embodiment, wave-number control such that the wavelength of AC outputted from the commercial power source 201 is selected whether it is to be subjected to power supply to the resistance heating element 108 every half-wave is adopted.

Adjustment of an amount of power supplied from the commercial power source 201 to the resistance heating element 108 for each predetermined period of time can be performed, in addition to the wave-number control, phase control such that a phase range of AC outputted from the commercial power source is determined. However, compared with the phase control, the wave-number control has the advantage of less occurrence of noise (e.g., harmonic current) or the like.

The second thermistor 101b is used for measuring a temperature of the heater 105 at a non-sheet-passing area (portion) in order to prevent temperature rise in the non-sheet-passing area for the fixing belt 103, the heater 105, the pressing roller 102, and the like in the case where a small-sized sheet as the recording material is passed through the fixing nip portion N.

When the second thermistor 101b detects the temperature of the heater 105 being not less than the predetermined temperature, the CPU 203 performs non-sheet-passing portion temperature rise prevention control by, e.g., decreasing the temperature of the heater 105 controlled by the first thermistor 101a or increasing an interval between adjacent two sheets conveyed in the fixing nip portion N. Accordingly, the second thermistor 101b a thermistor, for detecting temperature rise in the non-sheet-passing area, having a function as a sub-thermistor.

(3) Sequence of Image Forming Operation

Figure 8:
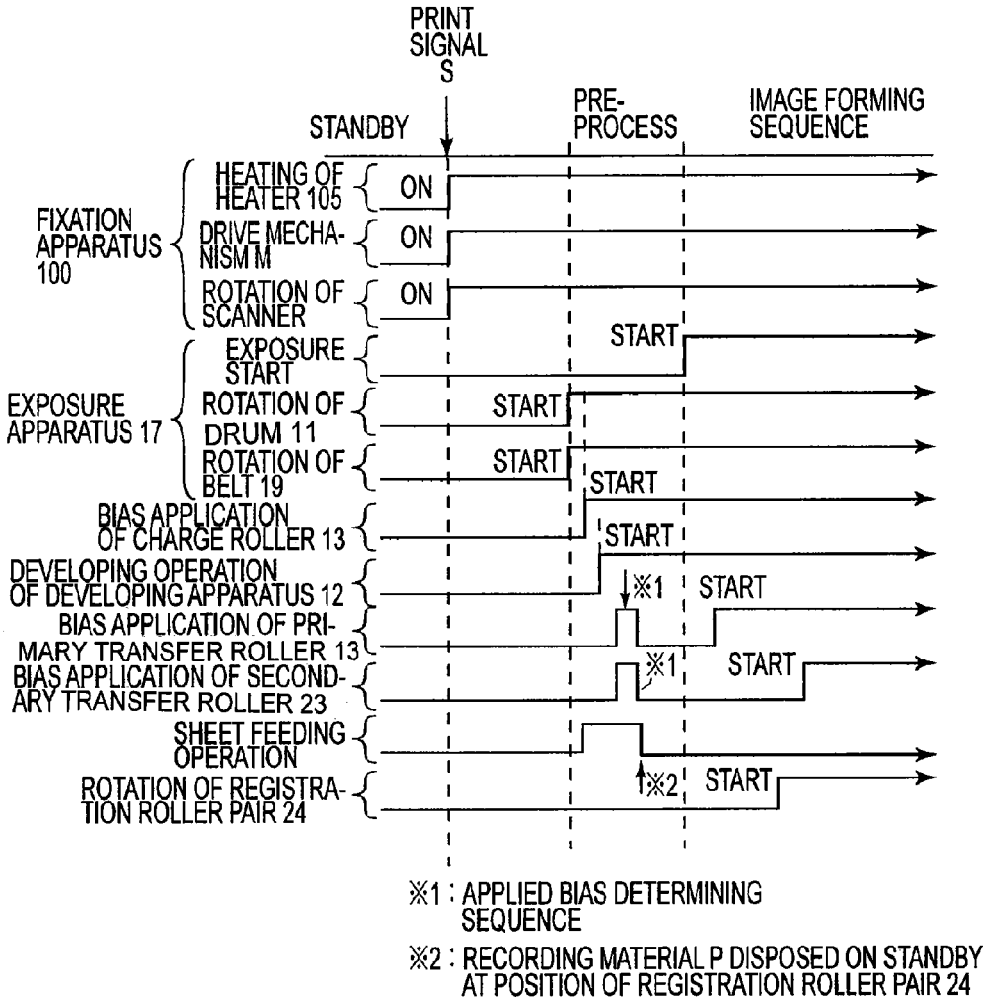
FIG. 8 is a timing chart of an image forming operation sequence in Embodiment 1.

The image forming operation of the image forming apparatus according to this embodiment will be described. FIG. 8 is a timing chart of an image forming operation sequence. When an image signal and a print signal S are inputted from an image reader (not shown) or a host apparatus (not shown), such as a computer or the like, into the CPU 203, the CPU 203 starts the image forming operation sequence.

First of all, the heater 105 of the fixing apparatus 100 starts heating up to a predetermined fixing temperature as a target temperature, and substantially simultaneously therewith, the drive mechanism M is actuated to start rotation of the fixing belt 103 and the pressing roller 102. Further, rotation of scanner of the exposure apparatuses 17Y, 17M, 17C and 17Bk is started to increase a rotation speed of a polygon mirror up to a predetermined rotation speed.

The heating start of the fixing apparatus 100 and the rotation start of the scanner are performed simultaneously with or after the input of the print signal S.

Image forming operations other than the heating of the fixing apparatus and the rotation of the scanner will be considered by dividing the operations into a) pre-process (sequence) and b) image forming sequence.

a) In the pre-process, rotation of the photosensitive drums 11Y, 11M, 11C and 11Bk is started when the temperature of the heater 105 reaches a predetermined temperature. After a lapse of a predetermined temperature from the start of the photosensitive drum rotation, application of a charging bias (voltage) for applying a predetermined voltage to the charging roller is started to electrically charge the photosensitive drum surface at a predetermined potential. This is because when the rotation start of the photosensitive drum and the application start of the charging bias are performed at the same time, there is a possibility that a memory occurs on the photosensitive drum.

Next, after portions electrically charged to the predetermined potential at the surfaces of the photosensitive drums 11Y, 1M, 11C and 11Bk reach corresponding developing portions of the developing apparatuses 12Y, 12M, 12C and 12Bk, a developing operation (rotation of developing roller and developing bias application for applying a predetermined bias to the developing roller) is started. This is because when the developing bias is applied before the portions electrically charged to the predetermined potential reach the corresponding developing portions, there is a possibility that jumping of toner positioned on the developing roller onto the photosensitive drum is caused to occur.

Further, after the portions electrically charged to the predetermined potential on the photosensitive drum surfaces reach corresponding contact portions with the primary transfer rollers 13Y, 13M, 13C and 13Bk, a predetermined voltage or current is applied to an associated primary transfer roller to detect a resistance value of the primary transfer roller. As a result, a constant voltage value or a constant current value applied to the primary transfer roller applied during the primary transfer for transferring the toner image from the photosensitive drum onto the intermediary transfer belt 19 is determined. Similarly, a resistance value of the secondary primary roller is detected by applying a predetermined voltage or current to the secondary transfer roller 23, so that a constant voltage value or a constant current value applied during the secondary transfer for transferring the toner image from the intermediary transfer belt 19 onto the recording material P is determined. However, it is not necessary to effect the sequence for determining the bias values applied to the primary and secondary transfer rollers every time.

Simultaneously with or after the start of rotation of the photosensitive drum, the recording material P fed out of a paper (sheet) supply cassette 25 is on standby at a position of registration roller pair 24.

At a time when the rotation speed of the polygon mirror reaches a predetermined rotation speed to place the photosensitive drums, the developing apparatuses, the primary transfer rollers, and the like in a state capable of starting image formation, the pre-process is completed.

Accordingly, the pre-process is a sequence for placing the image forming apparatus in a state preparing for start of image formation and is a sequence for starting principally rotation of the photosensitive drum.

b) After the pre-process is completed, the image forming sequence is started. The image forming sequence is started in such a manner that the photosensitive drums 11Y, 1M, 11C and 11Bk are subjected to exposure to light such as laser light issued from the exposure apparatuses 17Y, 17M, 17C and 17Bk at a predetermining timing so that respective color toners are primary-transferred onto the intermediary transfer belt 19 in a multiple-transfer manner.

Then, at a predetermined timing in synchronism with the start of exposure by the exposure apparatuses, the registration roller pair 24 start feeding of the recording material P so that the toner image multiple-transferred onto the intermediary transfer belt 19 through the primary transfer can be secondary-transferred onto the recording material P.

The recording material P onto which the toner image on the intermediary transfer belt 19 is secondary-transferred by the secondary transfer roller 23 is conveyed to the fixing apparatus 100, where the toner image is fixed on the recording material P and is further conveyed outside the image forming apparatus to complete the image forming operation.

Accordingly, the image forming sequence is a sequence for determining timing (image writing timing) at which the image forming apparatus starts image formation and is a sequence for principally starting the light exposure.

The image forming sequence in this embodiment is constituted as a sequence started by starting the light exposure as a starting point but may also be constituted as a sequence started with the sheet-feeding start of the recording material P from the sheet-feeding cassette 25 or the registration roller pair 24 as a starting point in the case where the start of the light exposure, the primary transfer, and the secondary transfer are performed in synchronism with a sheet-feeding timing of the recording material P from the sheet supply cassette 25 or the registration roller pair 24 depending on an image forming apparatus constitution, such as a distance relationship among the primary transfer portions (the primary transfer rollers 13Y, 13M, 13C and 13Bk), the secondary transfer portion (the secondary transfer roller 23), the Registration roller pair 24, and the sheet-feeding cassette 25. In this case, the image forming sequence is a sequence for principally starting the feeding of the recording material P.

Figure 9:
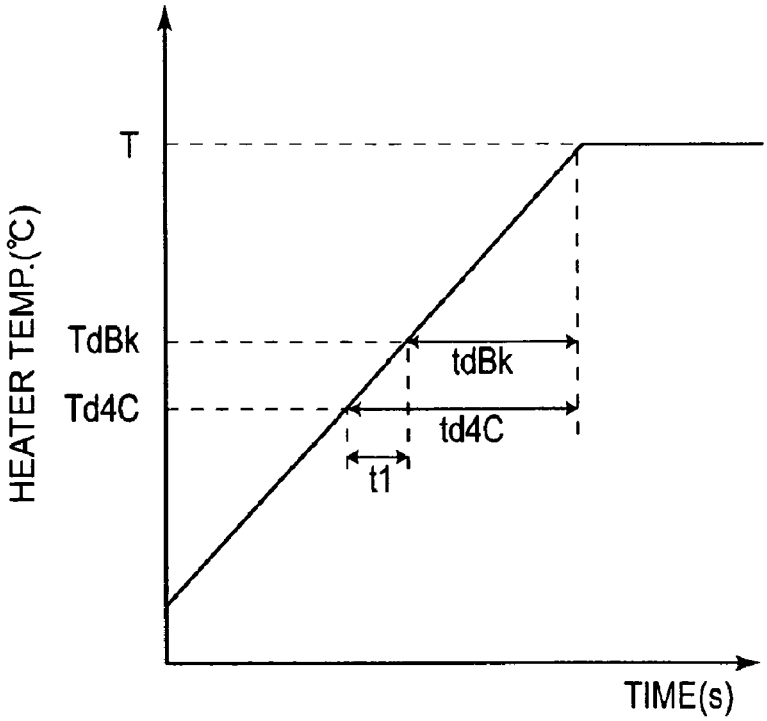
FIG. 9 is a graph showing a rise temperature and control of the heater used in Embodiment *1*.

FIG. 9 is a graph showing temperature rise with time of the heater 105 in the case where heating of the heater 105 is started by inputting the print signal S into the image forming apparatus at room temperature and a temperature of the heater 105 is detected by the first thermistor 101a.

The heating of the heater 105 is started at a predetermined power and at the time when the temperature of the heater 105 reaches a predetermined fixing temperature (fixable temperature) T (° C.) (i.e., when the temperature at the surface of the fixing belt 103 reaches the predetermined fixing temperature), the power supplied to the heater 105 may appropriately be increased or decreased depending on the temperature detected by the first thermistor 101a by the PID control so that the temperature of the heater 105 is the fixing temperature T (° C.).

At the time when the heater temperature reaches the fixing temperature T (° C.), image formation may preferably be performed at timing such that a leading edge reaches the fixing nip portion N since there is no occurrences fixation failure and loss of power consumption.

Here, td4C (sec) means a time required for the leading edge of the recording material P to reach the fixing nip portion N in the case where the pre-process is started during the full-color image formation and then the image forming sequence is performed.

In the conventional image forming apparatus, during both of the full-color image formation and the mono-color image formation (e.g., black image formation), temperature control has been performed so that the pre-process is started at a time corresponding to a predetermined temperature, which is the same temperature of the heater 105, such as Td4C (° C.) which is a heater temperature at a time being td4C (sec) before a time at which the heater temperature reaches the fixing temperature T (° C.) and that the leading edge of the recording material P reaches the fixing nip portion N at a time when the heater temperature is the fixing temperature T (° C.).

In this case, however, the pre-process start temperature during the black image formation (mono-color image formation) may be changed to TdBk (° C.) at a time delayed by t1 (sec) corresponding to a distance between the primary transfer rollers 13Y and 13Bk (i.e., the distance/the rotation speed of the intermediary transfer belt 19, compared with the case of the full-color image formation.

In this embodiment, such a constitution that the temperature of the heater 105 for starting the pre-process is variable depending on whether the image formation is the full-color image formation or the mono-color image formation is adopted to prolong the life of the photosensitive drum.

Here, tdBk (sec) means a time required for the leading edge of the recording material P to reach the fixing nip portion N in the case where the pre-process is started during the black image formation and then the image forming sequence is performed. In this embodiment, tdBk (sec) is shorter than td4C (sec) by t1 (sec).

In the case where the same pre-process start temperature is employed during both of the full-color image formation and the black image formation, when the black toner image is formed, such as a problem that the recording material P reaches the fixing nip portion N before the heater 105 temperature (° C.) reaches the fixing temperature (° C.), thus resulting in an occurrence of fixation failure or poor fixation. Further, when the full-color toner image is formed, the recording material P is not interposed in the fixing nip portion N immediately after the heater 105 temperature (° C.) reaches the fixing temperature (° C.), thus resulting in an occurrence of loss of power consumption and an increase in FPOT.

In this embodiment, however, during the full-color image formation, the pre-process is started at the heater 105 temperature of Td4C (° C.) similarly as in the case of the conventional image forming apparatus as shown in FIG. 9. Further, different from the case of the conventional image forming apparatus, during the black image formation, temperature control is performed so that the pre-process is started at a time corresponding to a predetermined temperature, which is the same temperature of the heater 105, such as TdBk (° C.) which is a heater temperature at a time being tdBk (sec) before a time at which the heater temperature reaches the fixing temperature T (° C.) and that the leading edge of the recording material P reaches the fixing nip portion N at a time when the heater temperature is the fixing temperature T (° C.).

Accordingly, according to this embodiment, compared with the case of the full-color image formation, during the black image formation, the pre-process is started at a higher temperature of the heater 105, so that a rotation time of the photosensitive drums 11Y, 11M, 11C and 11Bk is reduced by t1 (sec). As a result, it is possible to provide an image forming apparatus capable of increasing the lifespan of the photosensitive drums during the mono-color image formation by reducing an abrasion of the surface layers of the photosensitive drums 11Y, 11M, 11C and 11Bk, caused due to friction with the brushes or blades of the photosensitive drum cleaning apparatuses 14Y, 14M, 14C and 14Bk, after being deteriorated by the charging operation.

Even in an actual color image forming apparatus, in the case where it is used in office or the like, the effect of this embodiment is great since a black image such as a document image or the like is dominantly formed and a full-color image such as a picture image or the like is less formed. More specifically, the lifespan of the photosensitive drum is increased by about 1.3 times that in the case of the conventional image forming apparatus. However, the lifespan of the photosensitive drum in a design-associated office in which a full-color image is dominantly used or a printing office in which the number sheets subjected to continuous printing is large, is merely increased by about 1.1 times, thus resulting in less effect.

Further, in the color image forming apparatus, an amount of toner R per unit area on the recording material R during the full-color image formation is generally about 2 times that in the case of the mono-color image formation at the maximum although it varies depending on the constitution of the image forming apparatus. Accordingly, in the case of the same recording material conveyance speed, the fixable temperature of the toner R on the recording material P is high during the full-color image formation and is low during the mono-color image formation.

Figure 10:
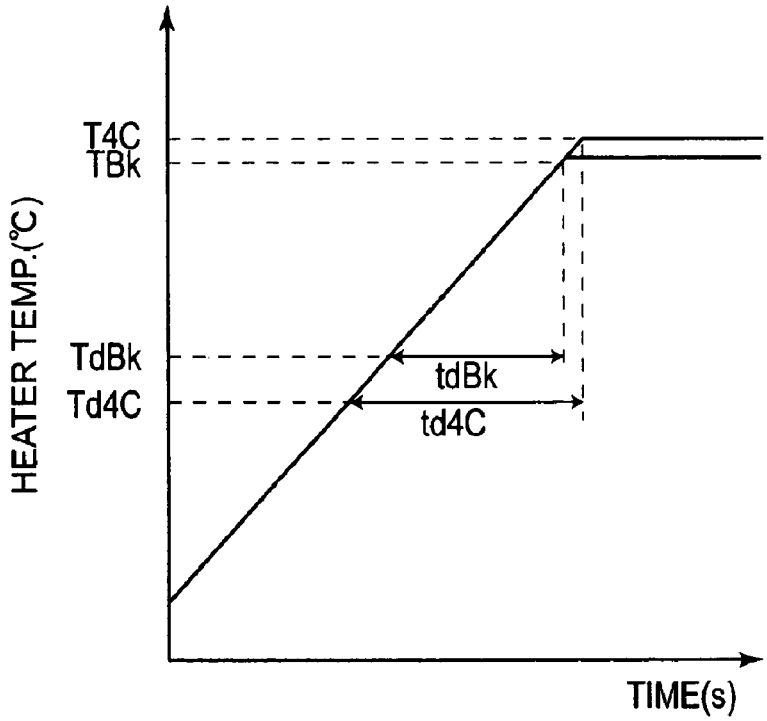
FIG. 10 is a graph showing a rise temperature and control of the heater, used in Embodiment 1, having different fixing temperatures between during full-color image formation and during mono-color image formation.

FIG. 10 is a graph showing temperature rise of the heater 105 in the case where the fixing temperature is variable with respect to the cases of the full-color image formation and the mono-color image formation. Similarly as in the above described embodiment, also in such an image forming apparatus in which the fixing temperature of the heater 105 is T4C (° C.) during the full-color image formation and is TbK (° C.), lower than T4C (° C.). during the mono-color image formation (e.g., black image formation), it is possible to achieve the effect of increasing the lifespan of the photosensitive drum during the mono-color image formation by starting the pre-processes for the full-color image formation and the mono-color image formation at times, corresponding to the heater 105 temperatures of Td4C (° C.) and TdBk (° C.), which are td4C (sec) and tdBk (sec), respectively, earlier than times corresponding to the fixing temperatures of T4C (° C.) and TbK (° C.), respectively.

Further, according to such a constitution that the fixing temperature during the mono-color image formation is lowered compared with the case of the full-color image formation, the FPOT during the mono-color image formation can be more suitably decreased.

Further, as described above, in the case where the same recording material conveyance speed is adopted in the color image forming apparatus, the fixable temperature of toner on the recording material is high during the full-color image formation and low during the mono-color image formation, so that an image forming apparatus having a high image forming speed (recording material conveyance speed) during the mono-color image formation while employing the same fixing temperature has also been put into practical use.

Figure 11:
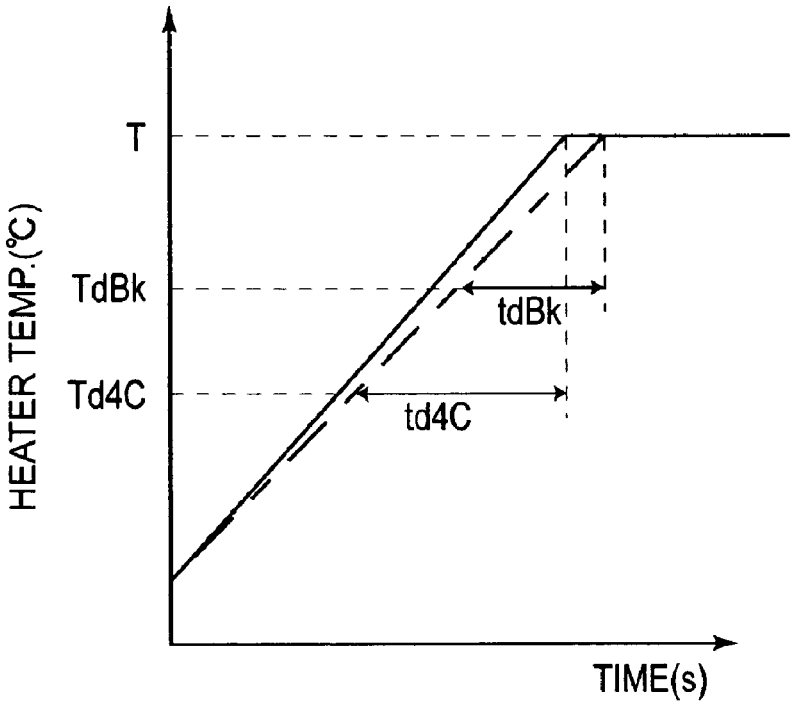
FIG. 11 is a graph showing a rise temperature and control of the heater, used in Embodiment *1*, having different recording material conveyance speeds between during full-color image formation and during mono-color image formation.

FIG. 11 is a graph showing temperature rise of the heater 105, in which the heater temperature rise during the full-color image formation is indicated by a solid line and the heater temperature rise during the black image formation in which the image forming speed (recording material conveyance speed) is higher than that during the full-color image formation is indicated by alternate long and short dashed line.

The heater temperature rise during the black image formation has a gentler slope because the rotation speeds of the fixing belt 103 and the pressing roller 102 are higher to increase an amount of heat absorbed by the fixing belt 103 and the pressing roller 102. Further, during the black image formation, the conveyance speed of the recording material P is also higher, so that the time tdBk (sec) required for the leading edge of the recording material P to reach the fixing nip predetermined N since the pre-process is started and then the image forming is performed is smaller than those shown in FIGS. 10 and 11.

Accordingly, as shown in FIG. 11, also in such a constitution that the same fixing temperature T (° C.) of the heater 105 is used during both of the full-color image formation and the mono-color image formation and the recording material predetermined conveyance speed (image forming speed) during the black image formation is higher than that during the full-color image formation, similarly as in the above described embodiments, it is possible to achieve the effect of increasing the lifespan of the photosensitive drum during the mono-color image formation by starting the pre-processes for the full-color image formation and the mono-color image formation at times, corresponding to the heater 105 temperatures of Td4C (° C.) and TdBk (° C.), which are td4C (sec) and tdBk (sec), respectively, earlier than times corresponding to the fixing temperature T (° C.).

As described above, according to Embodiment 1, it is possible to provide an image forming apparatus capable of increasing the lifespan of image forming apparatus constitutional members, such as the photosensitive drums during the mono-color image formation by changing the pre-process start temperature of the fixing apparatus member with respect to the cases of the full-color image formation and the mono-color image formation in such an image forming apparatus that heating of the fixing apparatus and the image forming operation are performed simultaneously and the image forming operation is started depending on a temperature of the fixing apparatus member.

The pre-process start temperature of the fixing apparatus member during the mono-color image formation is set to be higher than that during the full-color image formation, whereby it is possible to increase the lifespan of the photosensitive drums and prevent loss of power consumption and fixation failure (poor fixability).

The pre-process start temperature is made variable depending on the fixing temperature or the image forming speed (recording material conveyance speed), whereby it is possible to realize the increased lifespan of the photosensitive drums and prevention of the power consumption loss and the fixation failure even in an image forming apparatus employing such variable fixing temperature and image forming apparatus.

When the present invention is applied to such a quick start fixing apparatus using a fixing apparatus member having a low heat capacitance providing a rise time, required for the temperature of the fixing apparatus member to reach the fixing temperature since the start of heating (temperature rise), of not more than 60 sec, preferably not more than 30 sec, a temperature rise speed of the fixing apparatus member is high. For this reason, the effects of increasing the lifespan of the photosensitive drums and preventing the power consumption loss and the fixation failure are further enhanced advantageously.

Embodiment 2

Embodiment 2 according to the present invention will be [Described] *described with reference to* FIGS. 12-14.

In Embodiment 1 described above, the lifespan of the image forming apparatus member during the mono-color image formation is increased by using the pre-process that temperature during the mono-color image formation different from that during the full-color image formation.

However, in the case where a voltage (power) supplied to the image forming apparatus is a lower-limit value in Embodiment 1, the power supplied to the heater 105 of the fixing apparatus 100 is small. As a result, the temperature rise speed of the heater 105 is low, so that there is a possibility of an occurrence of the fixation failure due to the low temperature rise speed.

Further, in the case where the voltage (power) supplied to the image forming apparatus is an upper-limit value in Embodiment 1, the power supplied to the heater 105 of the fixing apparatus 100 is high. As a result, the temperature rise speed of the heater 105 is high, so that there is a possibility of an occurrence of loss of power consumption in the fixing apparatus. Further, the surface temperatures of the fixing belt 103 and the pressing roller 102 are high, so that there is also a possibility of an occurrence of an irregularity in gloss in an area corresponding to one circumference at a leading end portion on a first sheet of the recording material for image formation.

Figure 12:
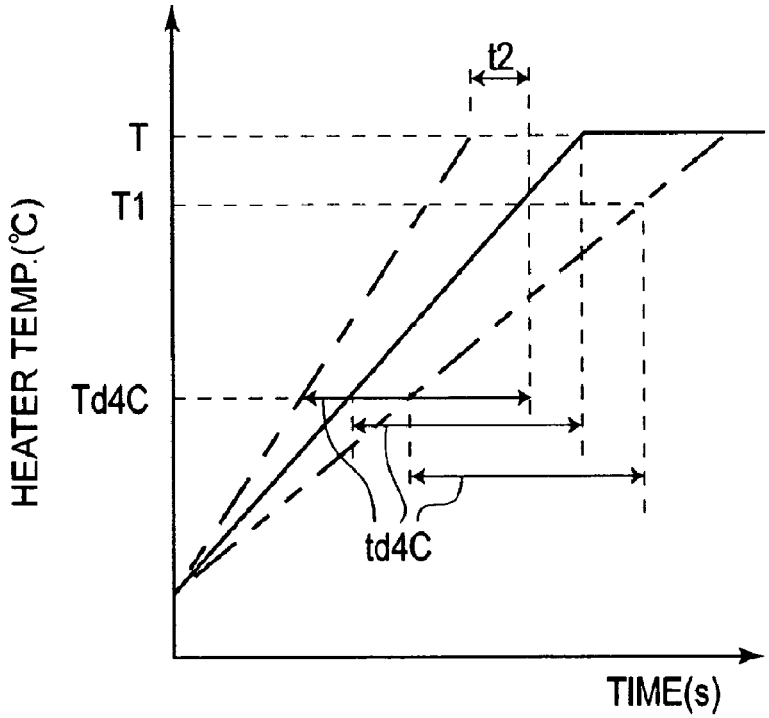
FIG. 12 is a graph showing a rise temperature and control of the heater used in Embodiment 1 during supply of upper and lower limit powers.

FIG. 12 is a graph showing control at the upper and lower-limit powers supplied to the fixing apparatus 100 in Embodiment 1. In FIG. 12, the temperature rise of the heater 105 during the full-color image formation is indicated by a solid line for the case where power supplied to the heater 105 is a center value, alternate long and short dashed lines, for the case where the power is an upper value, and a chain double-dashed line for the case where the power is a lower limit value.

In the case of the center-value power indicated by the solid line, when the pre-process is started at a time corresponding to a heater 105 temperature of Td4C (° C.), the heater 105 temperature just reaches a fixing temperature T (° C.) at a time, after a lapse of td4C (sec) from the start of the pre-process, at which a leading edge of the recording material P reaches the fixing nip portion N. As a result, there is no loss of power consumption, and a fixability is good.

However, in the case of the upper-limit power indicated by the alternate long and short dashed lines, when the pre-process is started at a time corresponding to a heater 105 temperature of Td4C (° C.), the heater 105 has a higher temperature rise speed, so that the heater 105 temperature reaches the fixing temperature T before the leading edge of the recording material P reaches the fixing nip portion N. For this reason, loss of power consumption is caused to occur by t2 (sec). Further, even when the heater 105 temperature is controlled at the fixing temperature T (° C.) with respect to a first sheet for image formation, the surface temperatures of the fixing belt 103 and the pressing roller 102 are high. As a result, at a leading end portion of an image on the recording material P, toner in an amount corresponding to one circumference of the fixing belt 103 is excessively melted to increase gloss of the image, so that the surface temperatures of the fixing belt 103 and the pressing roller 102 are abruptly lowered during passing of the recording material P through the fixing nip portion N. For this reason, the image gloss at a portion subsequent to the portion corresponding to one circumstance of the fixing belt 103 is lowered, so that an irregularity in gloss of image on the recording material P at the leading end portion corresponding to one circumference of the fixing belt 103 (fixing member).

With respect to the first sheet of recording material P after start of image formation, in such a conventional fixing apparatus using the fixing member, such as the fixing roller or the like, having a large heat capacity, a lowering in temperature within one sheet of the recording material P is small due to the large heat capacity even when the recording material P passes through the fixing nip portion N. As a result, the image forming apparatus has the advantage of less occurrence of the gloss irregularity of one circumference of the fixing member.

However, in the quick start fixing apparatus using the fixing member, such as the fixing belt, a thin fixing roller or the like, having a small heat capacity, a lowering in temperature within one sheet of the recording material P is large due to the small heat capacity when the recording material P passes through the fixing nip portion N. As a result, the image forming apparatus has the disadvantage that the gloss irregularity of one circumference of the fixing member is liable to occur.

Further, in the case of the lower-limit power indicated by the chain double-dashed line, when the pre-process is started at a time corresponding to a heater 105 temperature of Td4C (° C.), the heater 105 temperature does not reach the fixing temperature T (° C.) at a time, after a lapse of td4C (sec) from the start of the pre-process, at which a leading edge of the recording material P reaches the fixing nip portion N. The leading edge of the recording material P reaches the fixing nip portion N at a time corresponding to a temperature T1 (° C.) which is lower than the fixing temperature T (° C.), so that such a fixation failure (poor fixability) that a deposition force of the toner R on the recording material P is small.

The above description is made with respect to the case of the full-color image formation but the problems, such as the power consumption loss and the gloss irregularity of one circumference of the fixing belt at the upper-limit power, and the fixation failure at the lower-limit power are problems similarly arising during the mono-color image formation such as the black image formation although explanation therefore is omitted.

In this embodiment (Embodiment 2), there is provided an image forming apparatus capable of having a good fixability with no occurrence of the power consumption loss and the gloss irregularity of one circumference of the fixing member even in the case where the power supplied to the image forming apparatus and the fixing apparatus fluctuates between the upper and lower limit values.

Figure 13:
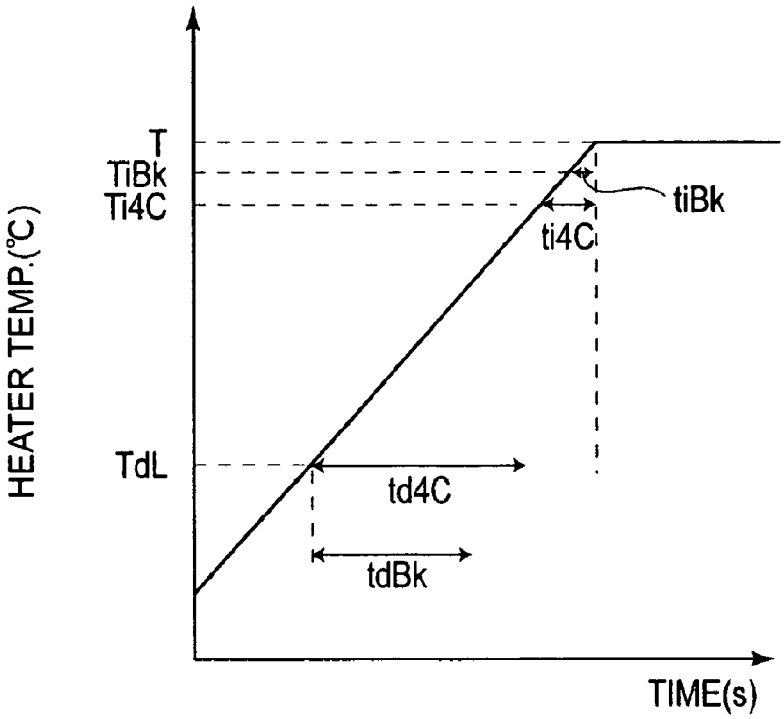
FIG. 13 is a graph showing a rise temperature and control of a heater used in Embodiment 2.

FIG. 13 is a graph showing control in the case where the power supplied to the fixing apparatus 100 is the center value in Embodiment 2. The pre-process is started, similarly as the case of the conventional image forming apparatus, at a time corresponding to a heater 105 temperature of TdL (° C.) during both of the full-color image formation and the mono-color image formation (e.g., the black image formation). In FIG. 13, ti4C (sec) and tiBk (sec) mean times required for the leading edge of the recording material P to reach the fixing nip portion N since the pre-process is started during the full-color image formation and during the black image formation, respectively. In the case of the image forming apparatus shown in FIG. 1, the time tiBk (sec) is shorter than the time ti4C (sec) by at least about a time corresponding to a distance between the photosensitive drums 11Y and 11Bk.

In this embodiment, the temperature TdL (° C.) is set to be somewhat lower than the temperature Td4C (° C.) shown in FIG. 12 in order to prevent the power consumption loss and the gloss irregularity of one circumference of the fixing belt at the upper-limit power.

Further, in a constitution shown in FIG. 13, during both of the full-color image formation and the black image formation at the center power, control is performed so that the leading edge of the recording material P reaches the fixing nip portion N at a time when the heater 105 temperature is the fixing temperature (° C.) by setting the control so that the pre-process is started at times, corresponding to Ti4C (° C.) and TiBk (° C.), respectively, which are ti4C (sec) and tiBk (sec) earlier than a time when the heater 105 temperature reaches the fixing temperature (° C.).

Figure 14:
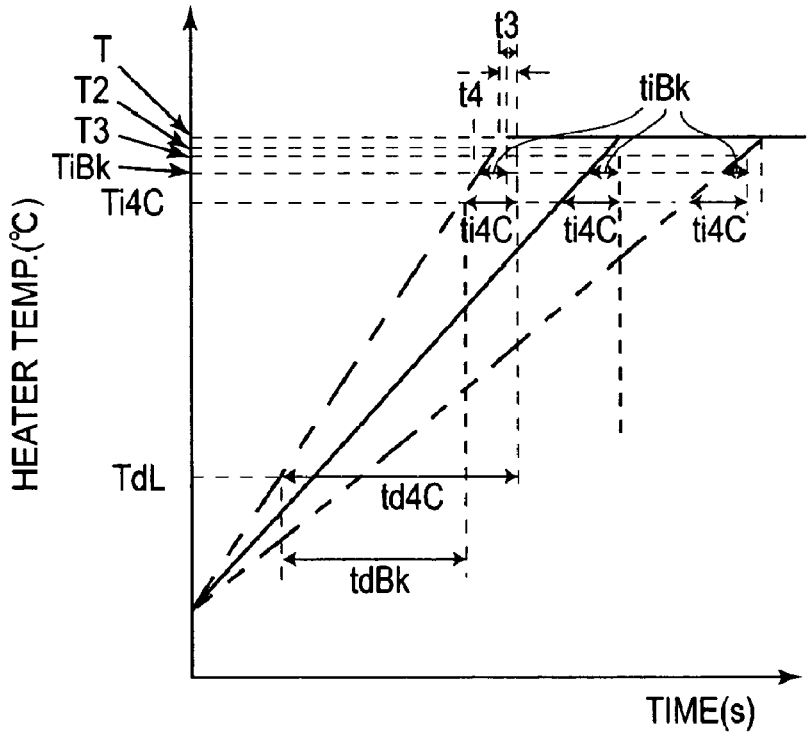
FIG. 14 is a graph showing a rise temperature and control of the heater used in Embodiment [1] *2* during supply of upper and lower limit powers.

FIG. 14 is a graph showing control in the case where the power supplied to the fixing apparatus 100 is the upper and lower limit values together with the case of the center value during the full-color image formation and the mono-color image formation in Embodiment 2. In FIG. 14, the center power supplied to the fixing apparatus 100 is indicated by a solid line, the upper-limit power is indicated by alternate long and short dashed lines, and the lower-limit power is indicated by a chain double-dashed line.

1) First, the case of the full-color image formation will be described. According to the control in Embodiment 2, in the case of supplying the upper-limit power indicated by the alternate long and short dashed line, the leading edge of the recording material P reaches the fixing nip portion N at a predetermined time which is ti4C (sec) later than a time corresponding to image forming start temperature of TdL (° C.) of the heater 105 and is the substantially same time as a time which is td4C (sec) later than a time corresponding to a pre-process start temperature of TdL (° C.) of the heater 105. Accordingly, the leading edge of the recording material P reaches the fixing nip portion N after a lapse of t3 (sec) since the heater 105 temperature reaches the fixing temperature T (° C.). The time t3 (sec) in FIG. 14 is considerably shorter than the time t2 (sec) in FIG. 12, so that the power consumption loss is small and the gloss irregularity of one circumference of the fixing belt is alleviated, thus being at a level of no problem.

Further, in the case of supplying the lower-limit power indicated by the chain double-dashed line even when the pre-process is completed after a lapse of td4C (sec) since the pre-process is started at a time corresponding to the pre-process start temperature of TdL (° C.) of the heater 105, the pre-process start is waited until the heater 105 temperature reaches Ti4C (° C.) and the leading edge of the recording material P reaches the fixing nip portion N at a time, corresponding to T3 (° C.), after a lapse of ti4C (sec) from a time corresponding to the image forming sequence start temperature of Ti4C (° C.) of the heater 105. T3 (° C.) in FIG. 14 is somewhat lower than T (° C.) but is considerably higher than T1 (° C.) in FIG. 12, thus being at level of no problem with respect to the fixability. Further, depending on the image forming apparatus used, T (° C.) may preferably be set to be higher than T2 (° C.) by $\Delta T$ (° C.)=(T−T2) so that the temperature T2 (° C.) is a fixation temperature.

2) Next, e.g., the black image formation as the mono-color image formation will be described. Similarly as in the full-color image formation, also during the black image formation, tiBk (sec) is shorter than Ti4C (sec), so that it is possible *to* set TiBk (° C.) to be higher than Ti4C (° C.).

Accordingly, according to the control in Embodiment 2, in the case of supplying the upper-limit power indicated by the alternate long and short dashed line, even when the pre-process is completed after a lapse of tdBk (sec) since the pre-process is started at a time corresponding to the pre-process-start temperature of TdL (° C.) of the heater 105, the pre-process start is waited until the heater 105 temperature reaches TiBk (° C.) and the leading edge of the recording material P reaches the fixing nip portion N at a time, after a lapse of t4 (sec) from a time, at which the heater 105 temperature reaches the fixing temperature T (° C.), after a lapse of tiBk (sec) from a time corresponding to the image forming sequence start temperature of TiBk (° C.) of the heater 105. For this reason, t4 (sec) during the black image formation is shorter than t3 (sec) during the full-color image formation, so that the image formation start temperature is made variable during both of the black image formation and the full-color image formation, whereby even in the case of supplying the upper-limit power, it is possible to further reduce the power consumption loss and alleviate the gloss irregularity of one circumference of the fixing belt at a level of no problem during the black image formation compared with the case of the full-color image formation.

Further, in the case of supplying the lower-limit power indicated by the chain double-dashed line even when the pre-process is completed after a lapse of tdBk (sec) since the pre-process is started at a time corresponding to the pre-process start temperature of TdL (° C.) of the heater 105, the pre-process start is waited until the heater 105 temperature reaches TiBk (° C.) and the leading edge of the recording material P reaches the fixing nip portion N at a time, corresponding to T2 (° C.), after a lapse of tiBk (sec) from a time corresponding to the image forming sequence start temperature of TiBk (° C.) of the heater 105. T2 (° C.) in FIG. 14 is somewhat lower than T (° C.) but is considerably higher than T1 (° C.) in FIG. 12, thus being at a level of no problem with respect to the fixability. Further, the image forming sequence start temperature is made variable during both of the black image formation and the full-color image formation, whereby compared with the case of the full-color image formation, during the black image formation, the leading edge of the recording material P can suitably be caused to reach the fixing nip portion N at a time closer to a time at which the heater 105 temperature is the fixing temperature T (° C.) in the case of supplying the lower-limit power.

Accordingly, in Embodiment 2, the pre-process start temperature for starting an operation and the image forming sequence start temperature are separately set and the image forming sequence start temperature is made variable during both of the full-color image formation and the mono-color image formation, so that the pre-process start temperature is set to be somewhat lower. For this reason, there is such a disadvantage that the photosensitive drum rotation is started earlier to decrease the life span of the photosensitive drum but it is possible to provide an image forming apparatus having the advantages of preventing the power consumption loss at the upper- and lower-limit powers, the glass irregularity of one circumference of the fixing belt, and the fixation failure during the full-color image formation and having further improved prevention effects of the above described problems during the mono-color image formation.

As described above, according to Embodiment 2, in such an image forming apparatus that the temperature rise of the fixing apparatus under heating and the image forming operation are performed simultaneously and the image forming operation is started depending on the fixing apparatus member temperature, the pre-process start temperature is made variable during both of the full-color image formation and the mono-color image formation, so that it is possible to provide an image forming apparatus capable of preventing occurrences of fixation failure and gloss irregularity of one circumference of the fixing member even in the case where the power supplied to the fixing apparatus is the upper-limit value or the lower-limit value.

The image forming sequence start temperature of the fixing apparatus member during the mono-color image formation is set to be higher than that during the full-color image formation, whereby it is possible to prevent loss of power consumption, gloss irregularity of one circumference of the fixing apparatus member, and fixation failure (poor fixability).

When the present invention is applied to such a quick start fixing apparatus using a fixing apparatus member having a low heat capacitance providing a rise time, required for the temperature of the fixing apparatus member to reach the fixing temperature since the start of heating (temperature rise), of not more than 60 sec, preferably not more than 30 sec, a temperature rise speed of the fixing apparatus member is high. For this reason, the effects of preventing the power consumption loss, gloss irregularity of one circumference of the fixing member, and the fixation failure are further enhanced advantageously.

Embodiment 3

Embodiment 3 according to the present invention will be [Described] *described with reference to* FIGS. 15-19.

In Embodiment 1 described above, the lifespan of the image forming apparatus member is increased by [using] *making* the pre-process [that] *start* temperature during the mono-color image formation different from that during the full-color image formation.

In Embodiment 2, the power consumption loss, the gloss irregularity of one circumference of the fixing member, and the fixation failure are prevented even when the voltage (power) supplied to the image forming apparatus and the fixing apparatus is changed to the upper-limit value or the lower-limit value by using the image forming sequence start temperature variable during both of the full-color image formation and the mono-color image formation.

In Embodiment 3 (this embodiment), by adopting such a color, of a combination of those of Embodiments 1 and 2, that the pre-process start temperature and the image forming sequence start temperature of the fixing apparatus member are separately set and these temperatures are made variable during both of the full-color image formation and mono-color image formation, it is possible to increase the lifespan of the image forming apparatus member (e.g., the photosensitive drum) during the mono-color image formation and to prevent the power consumption loss, the gloss irregularity of one circumference of the fixing member, and the fixation failure.

Figure 15:
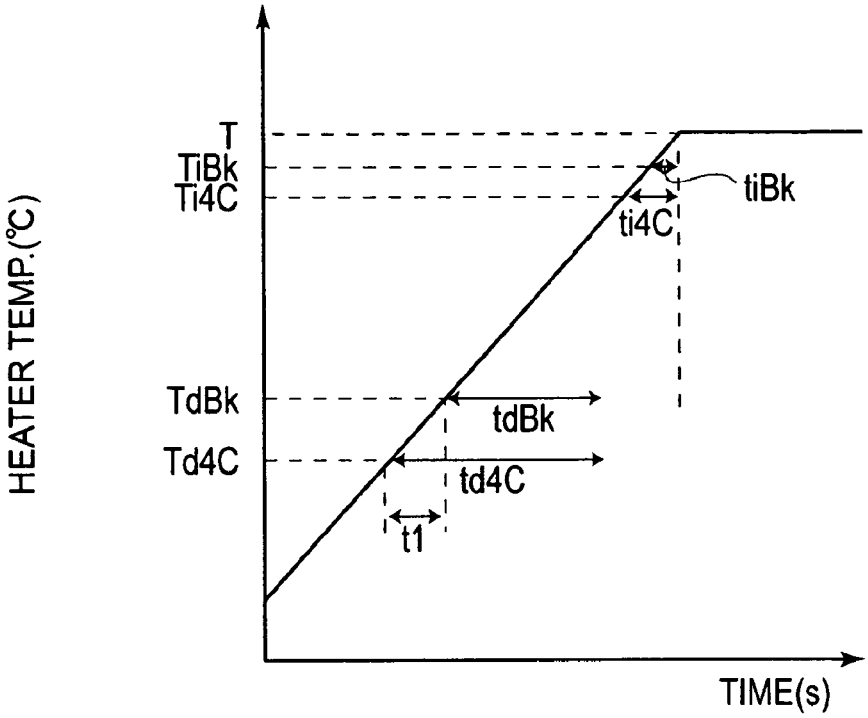
FIG. 15 is a graph showing a rise temperature and control of the heater used in Embodiment 1.

FIG. 15 is a graph showing control when the power supplied to the fixing apparatus 100 is the center value. The pre-process start temperature is Td4C (° C.) during the full-color image formation and TdBk (° C.) during the black image formation. As described in Embodiment 1, the pre-process start temperature is made variable during both of the full-color image formation and the mono-color image formation and is set to be higher than that during the full-color image formation, so that the lifespan of the photosensitive drum during the mono-color image formation can be increased.

In Embodiment 3, the temperatures Td4C (° C.) and TdBk (° C.) are set to be somewhat lower temperatures in order to prevent the power consumption loss and the glass irregularity of one circumference of the fixing belt during the supply of upper-and lower-limit powers.

Further, the image forming sequence start temperature is Ti4C (° C.) during the full-color image formation and TiBk (°

C.) during the black image formation. As described in Embodiment 2, image forming sequence start temperature is made variable during both of the full-color image formation and the mono-color image formation and the image forming sequence start temperature during the mono-color image formation is set to be higher than that during the full-color image formation, so that it is possible to provide an image forming apparatus having the advantages of preventing the power consumption loss at the upper- and lower-limit powers, the glass irregularity of one circumference of the fixing belt, and the fixation failure during the full-color image formation and having further improved prevention effects of the above described problems during the mono-color image formation.

Such a constitution that the pre-process start temperature and the image forming sequence start temperature are made variable depending on a heater 105 temperature at the time when the fixing apparatus starts temperature rise under heating (hereinafter referred to as an "initial heater (105) temperature") will be described.

Figure 16:
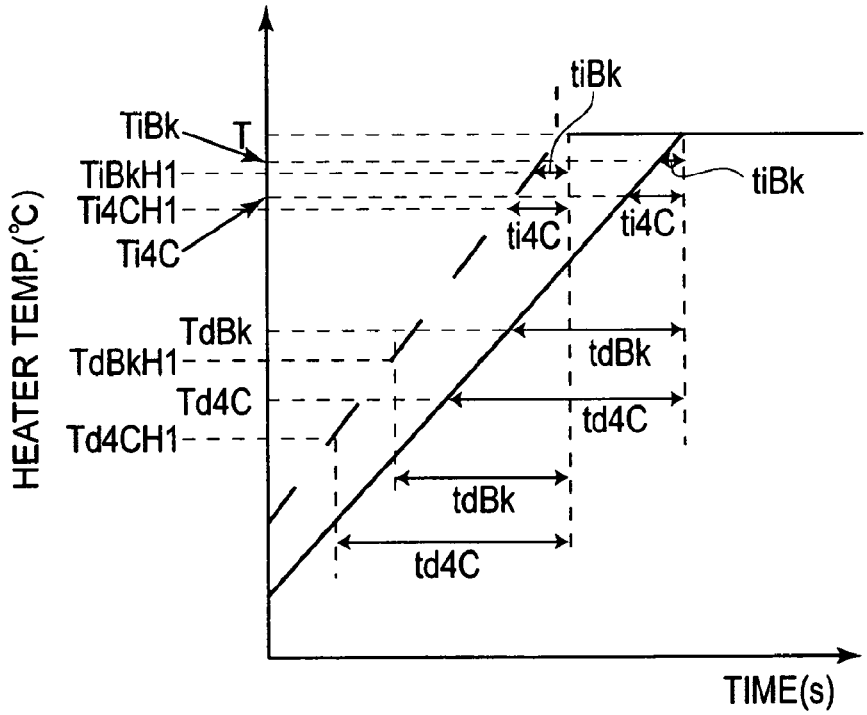
FIG. 16 is a graph showing a rise temperature and control of a heater, used in Embodiment 3, having different initial heater temperatures.

FIG. 16 is a graph showing control in the case where an initial heater 105 temperature of the fixing apparatus 100 is different in Embodiment 3. In FIG. 16, the case where the initial heater 105 temperature of the fixing apparatus 100 is room temperature (about 23° C.) is indicated by a solid line and the case where the initial heater 105 temperature is high temperature (about 100° C.) is indicated by alternate long and short dashed lines. The alternate long and short dashed lines indicating the case of the high initial heater 10t temperature represents the case where a print signal is inputted into the image forming apparatus in a relatively short time after completion of previous printing. The temperatures of the heater 105, the fixing belt 103, and the pressing roller 102 are high temperatures, so that a temperature rise speed of the heater 105 is high even when the same power is supplied.

Here, times td4C (sec) and td4Bk (sec) required for the pre-process during the full-color image formation and the mono-color image formation, respectively, and times ti4C (sec) and ti4Bk (sec) required for the image forming sequence during the full-color image formation and the mono-color image formation. respectively are the substantially same values both in the cases of the low initial heater temperature and the high initial heater temperature.

During the full-color image formation and the mono-color image formation, compared with the pre-process start temperatures Td4C (° C.) and TdBk (° C.) and the image forming start temperatures Ti4C (° C.) and TiBk (° C.) in the case where the heater 105 temperature is started from the room temperature, when the pre-process start temperatures Td4CH1 (° C.) and TdBkH1 (° C.) and the image forming sequence start temperatures Ti4CH1 (° C.) and TiBkH1 (° C.) in the case where the heater 105 temperature is started from the high temperature are set to be lower values, the leading edge of the recording material P just reaches the fixing nip portion N at a time when the heater 105 temperature reaches the fixing temperature (° C.).

More specifically, when the fixing temperature (fixing heater temperature) T (° C.) is 220° C. and the initial heater 105 temperature is set to be three threshold value ranges of less than 80° C., not less than 80° C. and less than 140° C., and not less than 140° C., such a constitution that the pre-process start temperatures and the image forming sequence start temperatures during the full-color image formation and the mono-color image formation are made variable depending on the respective initial heater 105 temperature is adopted. In a preferred constitution with an increasing initial heater 105 temperature, the pre-process start temperatures and the image forming sequence start temperatures are lowered (low temperatures).

Accordingly, during the full-color image formation and the mono-color image formation, the pre-process start temperatures and the image forming sequence start temperatures are made variable, so that it is possible to prevent the power consumption loss and the gloss irregularity of one circumference of the fixing belt at the high initial heater 105 temperature and the fixation failure at the low initial heater 105 temperature.

In the case where the initial heater 105 temperature is a very high temperature (the print signal is inputted into the image forming apparatus immediately after completion of previous printing), there is a possibility of an occurrence of the heater temperature higher than the pre-process start temperature. However, in such a case, e.g., it is possible to employ such a constitution that the power consumption loss and the gloss irregularity of one circumference of the fixing member are prevented by performing energization of the heater (start of power supply) after a lapse of a predetermined time since the pre-process is started.

Figure 17:
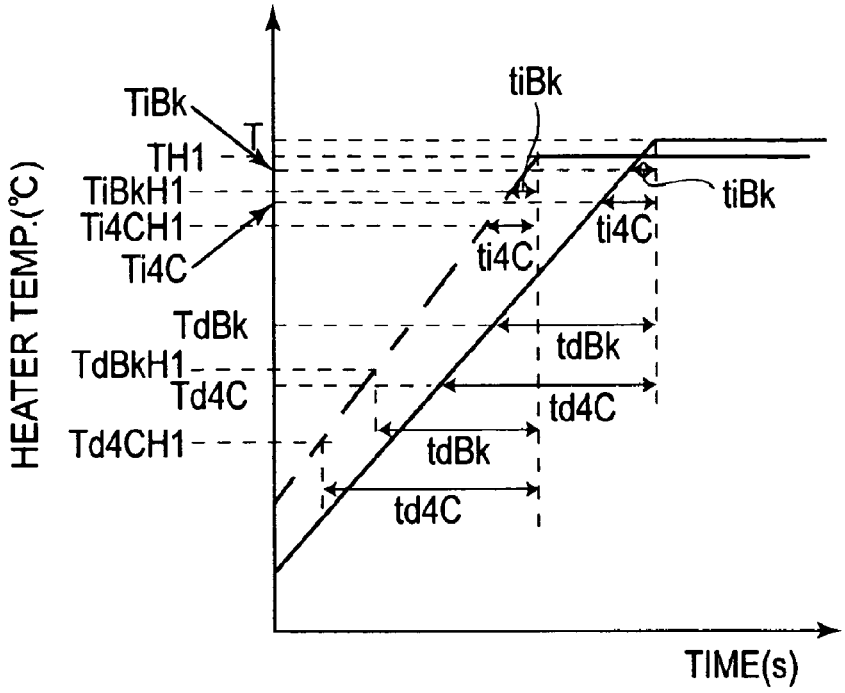
FIG. 17 is a graph showing a rise temperature and control of the heater, used in Embodiment 3, having different fixing temperatures in terms of the initial heater temperature.

FIG. 17 is a graph showing control in the case the fixing temperature is changed depending on the initial heater 105 temperature of the fixing apparatus in Embodiment 3. In FIG. 17, the case where the initial heater 105 temperature of the fixing apparatus 100 is room temperature (about 23° C.) is indicated by a solid line and the case where the initial heater 105 temperature is a high temperature (about 100° C.) is indicated by alternate long and short dashed lines. In FIG. 17, the fixing temperature is set to T (° C.) when the initial heater temperature is the room temperature and TH (° C.) lower than T (° C.) when the initial heater temperature is the high temperature.

In some cases, such a fixing apparatus that the fixing temperature is changed depending on the initial heater temperature, e.g., by lowering the fixing temperature at the high initial heater temperature since the fixability is good due to high temperatures of the heater 105, the fixing belt 103, and the pressing roller 102, has been proposed.

In such a fixing apparatus, as described with reference to FIG. 16, the fixing temperatures, the pre-process start temperatures, and the image forming sequence start temperatures are made variable depending on the initial heater temperature during the full-color image formation and the mono-color image formation, so that it is possible to prevent the power consumption loss and the gloss irregularity of one circumference of the fixing belt at the high initial heater temperature and the fixation failure at the low initial heater temperature.

Further, the image forming apparatus has an environmental temperature detection means TH (FIG. 5), and the fixing temperature, the pre-process start temperature, and the image forming start temperature are made variable depending on whether the environmental temperature is a normal environmental temperature, during the full-color image formation and the mono-color image formation. As a result, even in the low temperature environment and the high temperature environment, it is possible to prevent the power consumption loss and the gloss irregularity of one circumference of the fixing belt. Further, it is also possible to prevent the fixation failure when the initial heater temperature is low.

For example, in the case of the low temperature environment, the recording material P is cool, so that such a constitution that the fixing temperature is set to be high in order to prevent the fixation failure may be adopted. Further, it is possible to prevent the fixation failure in the low temperature environment by employing such a constitution that the fixing belt 103 and the pressing roller 102 are sufficiently warmed before the leading edge of the recording material P reaches the fixing nip portion N by setting the pre-process start temperature or the image forming sequence start temperature to be higher than the normal environmental temperature.

Figure 18:
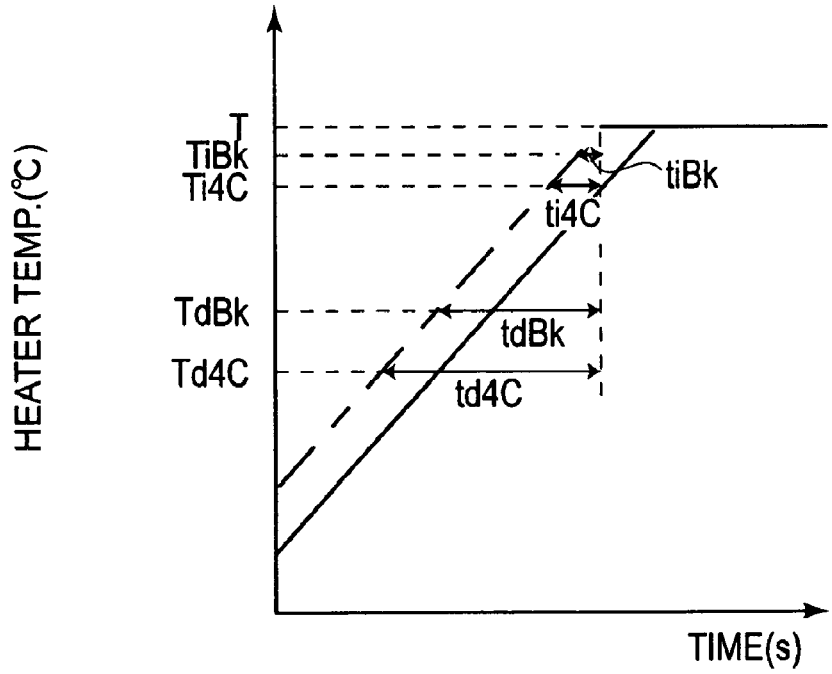
FIG. 18 is a graph showing a rise temperature and control of the heater used in Embodiment 3 with different [P??*s]** *power* at the initial heater temperature.

FIG. 18 is a graph showing control in the case where power supplied to the heater 105 is changed depending on the initial heater temperature of the fixing apparatus 100 in this embodiment. In FIG. 18, the case where the initial heater temperature of the fixing apparatus 100 is a room temperature (about 23° C.) is indicated by a solid line and the case where the initial heater temperature is a high temperature (about 100° C.) is indicated by alternate long and short dashed lines.

When the initial heater temperature is the high temperature, the temperatures of the heater 105, the fixing belt 103, and the pressing roller 102 are high, so that a temperature rise speed of the heater 105 is high when the same power is supplied to the heater 105.

For this reason, in a constitution shown in FIG. 18, the temperature rise speed of the heater 105 is kept at a constant level by supplying 100%-power to the heater 105 to increase the heater temperature to the fixing temperature T (° C.) when the initial heater temperature is the room temperature and supplying 50%-power to the heater 105 to increase the heater temperature to the fixing temperature T (° C.) when the initial heater temperature is the high temperature.

According to this constitution, it is possible to keep the temperature rise speed of the heater 105 at a constant level even when the initial heater temperature is the low temperature and the high temperature. For this reason, even when the pre-process start temperatures Td4C (° C.) and TdBk (° C.) and the image forming sequence start temperatures Ti4C (° C.) and TiBk (° C.) are constant values, it is possible to prevent the power consumption loss and the gloss irregularity of one circumference of the fixing belt and to prevent the fixation failure at the low initial heater temperature.

More specifically, e.g., in the case of wave-number control, supplied power may preferably be adjusted by thinning-out of a wave-number of a supplied voltage. Further, in the case of phase control, a phase range of the supplied voltage may preferably be changed to adjust supplied power.

Figure 19:
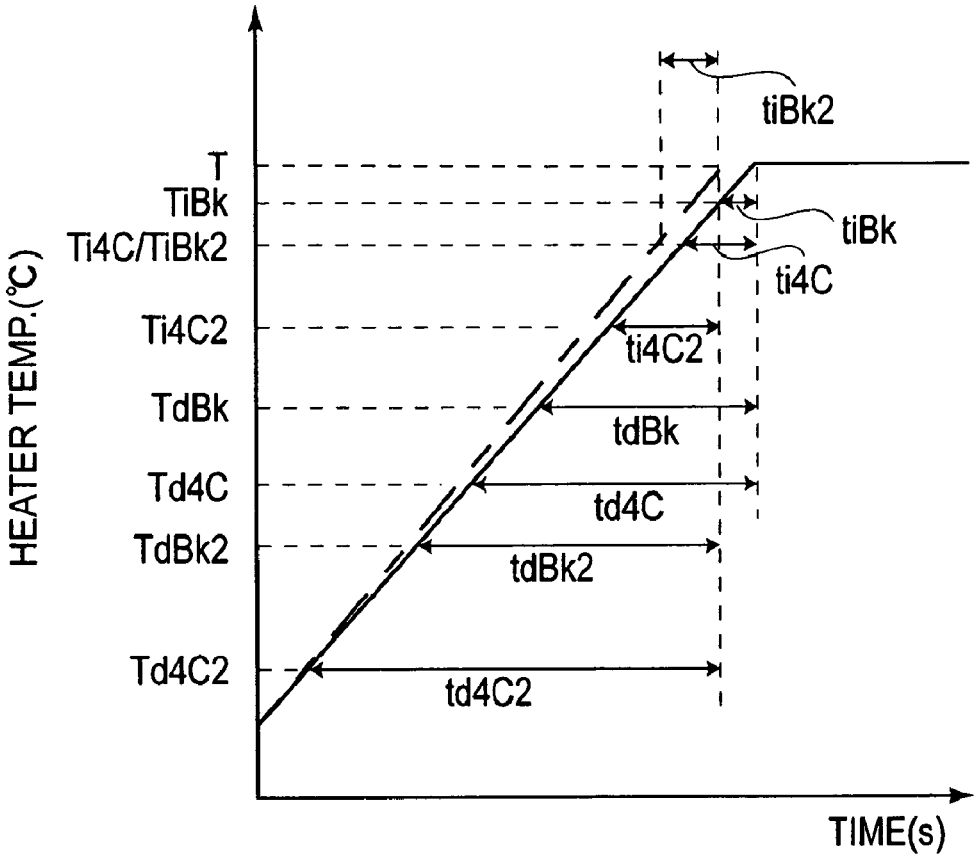
FIG. 19 is a graph showing a rise temperature and control of the heater used in Embodiment 3 at different image fixing speeds.

FIG. 19 is a graph showing control in the case where the pre-process start temperature and the image forming sequence start temperature are changed depending on an image forming speed of the fixing apparatus 100 in this embodiment.

As a constitution of the image forming apparatus, such a constitution that the image forming speed is changed has been proposed. For example, the image forming apparatus may be an image forming with a resolution of 600 dpi wherein the resolution is increased to 1200 dpi by decreasing the image forming speed to ½ thereof (half speed) while keeping a number of rotation of the polygon mirror of the exposure apparatus as it is, or an image forming apparatus capable of improving a fixability of thick paper by setting the image forming speed to be normal speed for plain paper (e.g., a basis weight of less than 105 g/m$^2$) and ½ of the normal speed for thick paper (e.g., a basis weight of not less than 105 g/m$^2$) and setting a passing time of the recording material P in the fixing apparatus 100 to be twice a normal passing time.

In FIG. 19, the case of an ordinary image forming speed (referred to as "normal speed") is indicated by a solid line and the case of ½ of the ordinary image forming speed (referred to as "half speed") is indicated by alternate long and short dashed lines. The temperature rise speed of the heater 105 at half speed is somewhat higher than that at normal speed since an amount of heat of the heater 105 absorbed by the fixing belt 103 and the pressing roller 102 is decreased.

In the case of the normal speed, as described in the above described embodiments, during the full-color image formation and the black image formation, the pre-process start temperatures are Td4C (° C.) and TdBk (° C.) and the image forming sequence start temperatures are Ti4C (° C.) and TiBk (° C.). Further, the times required for the pre-process are td4C (sec) and tdBk (sec), and the times required for the image forming sequence are ti4C (sec) and tiBk (sec).

In the case of the half speed, the photosensitive drum rotation speed and the conveyance speed of the recording material P and ½ of those in the case of the normal speed, so that during the full-color image formation and the black image formation, times td4C2 (sec) and tdBk2 (sec) required for the pre-process are a little less than about twice those in the case of the normal speed, and times ti4C2 (sec) and tiBk2 (sec) required for the image forming sequence are about twice those in the case of the normal speed.

Accordingly, in the case of the half speed, during the full-color image formation and the black image formation, the pre-process start temperatures are changed to Td4C2 (° C.) and TdBk2 (° C.) and the image forming sequence start temperatures are changed to Ti4C2 (° C.) and TiBk2 (° C.). Further, compared with the case of the normal speed, the start temperatures are changed to low temperatures. As a result, when the heater 105 temperature reaches the fixing temperature T (° C.), the leading edge of the recording material P just reaches the fixing nip portion N, so that it is possible to prevent the power consumption loss, the gloss irregularity of one circumference of the fixing belt, and the fixation failure.

The constitution in which the image forming speed is changed depending on the resolution and the kind of recording material will be described with reference to FIG. 19. However, depending on the image forming apparatus used, it is also possible to employ such a constitution that the fixing temperature is set to be high without changing the image forming speed in the case of the thick paper. In this case, also in such a constitution that the fixing belt 103 and the pressing roller 102 are sufficiently warmed before the leading edge of the recording material reaches the fixing nip portion N by setting the pre-process start temperatures and the image forming sequence start temperatures in the case of the thick paper to be higher than those in the case of the plain paper, it is possible to prevent the fixation failure in the case of the thick paper.

During the black image formation, compared with the full-color image formation, the pre-process start temperature and the image forming sequence start temperature are set to be higher, so that it is possible to increase the lifespan of the photosensitive drum and prevent the power consumption loss, the gloss irregularity of one circumference of the fixing member, and the fixation failure.

The fixing temperature, the pre-process start temperature, or the image forming sequence start temperature is made variable depending on the fixing apparatus member temperature when the print signal is inputted into the image forming apparatus to start the temperature rise of the fixing apparatus under heating, so that it is possible to increase the lifespan of the photosensitive drum and prevent the power consumption loss, the gloss irregularity of one circumference of the fixing member, and the fixation failure.

Further, by setting the fixing temperature, the pre-process start temperature, or the image forming sequence start temperature to be lower with an increasing fixing apparatus member temperature when the print signal is inputted into the image forming apparatus to start the temperature rise of the fixing apparatus under heating, it is possible to increase the lifespan of the photosensitive drum and prevent the power consumption loss, the gloss irregularity of one circumference of the fixing member, and the fixation failure.

Further, by decreasing the power supplied to the fixing apparatus, during the temperature rise of the fixing apparatus to the fixing temperature under heating, with an increasing fixing apparatus member temperature when the print signal is inputted into the image forming apparatus to start the temperature rise of the fixing apparatus under heating, so that it is possible to increase the lifespan of the photosensitive drum and prevent the power consumption loss, the gloss irregularity of one circumference of the fixing member, and the fixation failure.

Further, by setting the fixing temperature, the pre-process start temperature, or the image forming sequence start temperature to be lower with an increasing fixing apparatus member temperature when the print signal is inputted into the image forming apparatus to start the temperature rise of the fixing apparatus under heating, so that it is possible to increase the lifespan of the photosensitive drum and prevent the power consumption loss, the gloss irregularity of one circumference of the fixing member, and the fixation failure.

Further, by setting the fixing temperature, the pre-process start temperature, or the image forming sequence start temperature to be lower with an increasing fixing apparatus member temperature when the print signal is inputted into the image forming apparatus to start the temperature rise of the fixing apparatus under heating, it is possible to increase the lifespan of the photosensitive drum and prevent the power consumption loss, the gloss irregularity of one circumference of the fixing member, and the fixation failure.

The environmental temperature is detected and depending on the detected environmental temperature, the fixing temperature, the pre-process start temperature, or the image forming sequence start temperature is made variable, so that it is possible to increase the lifespan of the photosensitive drum and prevent the power consumption loss, the gloss irregularity of one circumference of the fixing member, and the fixation failure even in the low and high temperature environments.

The fixing temperature, the pre-process start temperature, or the image forming sequence start temperature is made variable depending on the image forming speed (recording material conveyance speed), so that it is possible to increase the lifespan of the photosensitive drum and prevent the power consumption loss, the gloss irregularity of one circumference of the fixing member, and the fixation failure even in the image forming apparatus capable of using a variable image forming speed.

The fixing temperature, the pre-process start temperature, or the image forming sequence start temperature is made variable depending on the kinds of recording materials, such as plain paper, thick paper, OHP paper, gloss paper, and the like, so that it is possible to increase the lifespan of the photosensitive drum and prevent the power consumption loss, the gloss irregularity of one circumference of the fixing member, and the fixation failure even with respect to various recording materials.

When the present invention is applied to such a quick start fixing apparatus using a fixing apparatus member having a low heat capacitance providing a rise time, required for the temperature of the fixing apparatus member to reach the fixing temperature since the start of heating (temperature rise), of not more than 60 sec, preferably not more than 30 sec, a temperature rise speed of the fixing apparatus member is high. For this reason, the effects of increasing the lifespan of the photosensitive drums and preventing the power consumption loss, gloss irregularity of one circumference of the fixing member, and the fixation failure are further enhanced advantageously.

Embodiment 4

Figure 20:
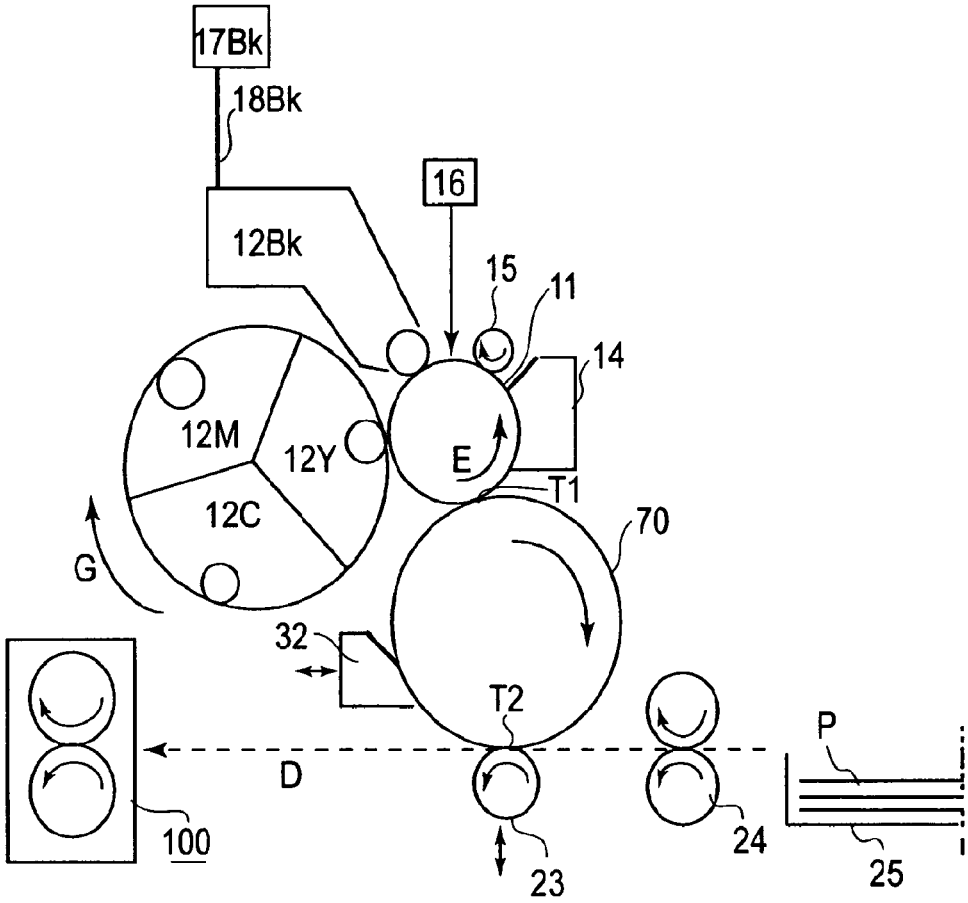
FIG. 20 is a schematic sectional view showing an embodiment of an image forming apparatus of one drum-type intermediary transfer type.

Embodiment 4 will be described with reference to FIG. 20 showing an embodiment of a color image forming apparatus of one drum type intermediary transfer scheme.

In this color image forming apparatus, toner images of respective single colors of yellow (Y), magenta (M), cyan (C), and black (Bk) formed on a photosensitive drum 11 are successively primary-transferred onto an intermediary transfer drum 70 as an intermediary transfer member in a superposition manner, and the superposed four-color toner images transferred onto the intermediary transfer drum 70 are simultaneously secondary-transferred onto a recording material P.

The photosensitive drum 11 is rotationally driven in a direction indicated by an arrow E. The surface of the photosensitive drum 11 is electrically charged uniformly by a charging roller 15 supplied with a predetermined bias. The charging roller 15 is rotated by the rotation of the photosensitive drum 11 to electrically charge the surface of the photosensitive drum 11 to a predetermined potential. The charged photosensitive drum 11 is subjected to exposure to light (laser light or the like) by an exposure apparatus 16 to form thereon an electrostatic latent image corresponding to a color separation image of an inputted original.

First, by a first developing apparatus 12Y (yellow), reversal development is performed with electrically charged (yellow) toner to form a yellow toner image corresponding to the electrostatic latent image on the surface of the photosensitive drum 11. The yellow toner image on the photosensitive drum 11 is rotated in a direction indicated by an arrow F at the substantially same speed as the photosensitive drum 11 and is primary-transferred onto the intermediary transfer drum 70 as the intermediary transfer member to which a predetermined bias is applied.

Primary transfer residual toner remaining on the photosensitive drum 11 after the primary transfer is effected is recovered by a photosensitive drum cleaning apparatus 14 provided with a blade or a brush or the like. The photosensitive drum 11 from which the primary transfer residual toner is removed is again electrically charged uniformly by the charging roller 15 to prepare for subsequent image formation.

Next, developing apparatuses 12Y, 12M and 12C are rotated in a direction indicated by an arrow G, so that a magenta toner image is formed on the surface of the photosensitive drum 11 in a similar manner as described above by a second developing apparatus 12M (magenta) and is primary-transferred onto the intermediary transfer drum 70. The developing apparatuses are further rotated in the arrow G direction and in the similar manner, a cyan toner image is formed on the surface of the photosensitive drum 11 by a third developing apparatus 12C (cyan) and is primary-transferred onto the intermediary transfer drum 70. Then, in the same manner, a black toner image is formed on the surface of the photosensitive drum 11 by a fourth developing apparatus 12Bk (black) and is primary-transferred onto the intermediary transfer drum 70.

In this embodiment (Embodiment 4), a larger amount of black image such as a document image is formed, so that the fourth developing apparatus 12Bk is disposed separately from the first to third developing apparatuses 12Y, 12M and 12C which are disposed in such a rotary developing unit that each developing apparatus effects development at an associated developing portion opposite to the photosensitive drum 11 by rotation. Depending on a constitution of the image forming apparatus used, the fourth developing apparatus 12Bk may also be integrally supported together with the first to third developing apparatuses 12Y, 12M and 12C as a rotary developing unit. Further, in the case where it is possible to employ a large photosensitive drum 11, all the four developing apparatuses 12Y, 12M, 12C and 12Bk may also be disposed separately from each other around the photosensitive drum 11 similarly as in the case of the four developing apparatus 12Bk.

By performing the above described operations, the yellow, magenta, cyan and black toner images successively formed on the photosensitive drum 11 are successively transferred onto the intermediary transfer drum 70 in a superposition manner.

In the case of four color based full-color image formation, four color toners are primary-transferred onto the intermediary transfer drum 70 at a primary transfer nip portion T1 in the order of Y, M, C and Bk (but in any order depending on the image forming apparatus used) by four times of rotation of the intermediary transfer drum 70. In the case of two or three color-based image forming mode, the primary transfer operation is completed after two or three times of rotation of the intermediary transfer drum 70.

The toner image transferred in the superposition manner are secondary-transferred onto the recording material (transfer material) P, which is taken out of a paper (sheet) supply cassette 25 and fed at predetermined timing by a registration roller pair 24, by a secondary transfer roller 23 to which a predetermined bias is applied. The recording material P onto which the toner images are secondary-transferred is conveyed in a conveyance path D to a fixing apparatus 100 by which the toner images on the recording material P are heated and pressed to be fixed on the recording material P.

In the case of the mono-color image formation (e.g., black image formation), after the primary transfer is performed, the toner images are conveyed on the intermediary transfer drum 70 to the secondary transfer roller 23, where the toner images are secondary-transferred onto the recording material P before completion of one rotation of the intermediary transfer drum 70.

Accordingly, compared with the full-color image formation of four colors, the mono-color image formation has a productivity which is about four times that in the case of the full-color image formation.

Secondary transfer residual toner remaining on the intermediary transfer drum 70 after the secondary transfer of the toner images is completed is recovered by an intermediary transfer drum cleaning apparatus 32 provided with a blade, a brush, or the like. The intermediary transfer drum 70 from which the secondary transfer residual toner is removed is again prepared for the primary transfer of subsequent image formation.

In order to disturb the toner images on the intermediary transfer drum 70 during the primary transfer in the color image formation, the blade or brush of the intermediary transfer drum cleaning apparatus 32 is of such a movable type that it is retracted in noncontact with the intermediary transfer drum 70 during the primary transfer and contacts the intermediary transfer drum 70 during the secondary transfer residual toner cleaning of the intermediary transfer drum 70.

In order to disturb the toner images on the intermediary transfer drum 70 during the primary transfer in the color image formation, the secondary transfer roller 23 is of such a movable type that it is retracted in noncontact with the intermediary transfer drum 70 during the primary transfer and contacts the intermediary transfer drum 70 during the secondary transfer.

A toner supply apparatus 17Bk supplies black toner in succession to the fourth developing apparatus 12Bk (black) through a supply path 18Bk.

Similarly as in Embodiments 1-3, also in this embodiment, the pre-process start temperatures or the image forming sequence start temperatures are made variable during the full-color image formation and the mono-color image formation, so that it is possible to realize an increase in lifespan of the photosensitive drum during the mono-color image formation and prevention of the power consumption loss, the glass irregularity of one circumference of the fixing belt, and the fixation failure.

Further, with respect to a time required for the leading edge of the recording material P to reach the fixing nip portion N since the pre-process or the image forming sequence is started, compared with a tandem-type color image forming apparatus, the one drum-type color image forming apparatus of this embodiment (Embodiment 4) has a large difference in the required time between the full-color image formation and the mono-color image formation. For this reason, a high degree of the effects of the present invention applied to this embodiment is achieved.

Accordingly, even when the present invention is applied to the one drum-type color image forming apparatus, effects which [is] *are* not less than those in Embodiments 1-3 are achieved.

As described above, the embodiments of the present invention are described but various numerical values used in Embodiments 1-4 of the present invention are more examples for simplifying description of Embodiments. Accordingly, these numerical values can be arbitrarily determined depending on constitutions and settings of the image forming apparatus and the fixing apparatus.

The present invention is not particularly limited to the color image forming apparatuses and the fixing apparatuses described in Embodiments 1-4 but may also be applicable to those according to other embodiments, such as arbitrary combinations of the respective Embodiments 1-4.

In the above described embodiments, the constitutions in which the pre-process or the image forming sequence is started depending on the temperature of the heater 105 *are adopted,* but in some cases of different constitutions of the fixing apparatus, it is also possible to adopt such [a] constitutions [that] *in which* the pre-process or the image forming sequence is started depending on an internal surface temperature of the fixing belt 103 by disposing the first thermistor 103 so that it contacts the SUS base layer 103a at the inner surface of the fixing belt 103a [at the inner surface of the fixing belt 103]. Further, such [a] constitutions that the pre-process or the image forming sequence is started depending on the surface temperature of the fixing belt 103 by disposing the first thermistor so that it contacts or does not contact the surface heat-resistant release layer of the fixing belt 103 may also be used.

Further, in the embodiments described above, the heater heating-type fixing apparatuses are described but the present invention is similarly applicable to other fixing apparatuses of electromagnetic induction heating-type (JP-A Hei 7-114276, JP-A Hei 9-44014, JP-A Hei 9-237675, etc.), pressure belt heating-type (JP-A Hei 11-212389, JP-A 2001-318544, JP-A 2001-356625, etc.), thin fixing roller heating-type, etc.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 358642/2004 filed Dec. 10, 2004, which is hereby incorporated by reference.

What is claimed is:

1. An image forming apparatus *comprising*:

an image forming unit for forming a toner image of a plurality of colors and a toner image of a predetermined single color on a recording material;

a fixing unit for heat fixing the toner image formed on the recording material;

an actuation unit for actuating said image forming unit in a state in which a temperature of said fixing unit is lower than a toner image fixing temperature in a case of forming the toner image of the plurality of colors and in [the] *a* case of forming the toner image of the predetermined single color; and a change unit for changing [a] *the toner image fixing* temperature of said fixing unit at the time of actuating said image forming unit in the case of forming the toner image of the plurality of colors and in the case of forming the toner image of the predetermined single color.

2. An apparatus according to claim 1, wherein a difference between the toner image fixing temperature of said fixing unit and the temperature of said fixing unit at the time of actuating said image forming unit is smaller in the case of forming the toner image of the predetermined single color than in the case of forming the toner image of the plurality of colors.

3. An apparatus according to claim 1, wherein the temperature of said fixing unit at the time of actuating said image forming unit is higher in the case of forming the toner image of the predetermined single color than in the case of forming the toner image of the plurality of colors.

4. An apparatus according to claim 1, wherein said image forming unit includes a plurality of photosensitive members on which a toner image is to be formed, and said change unit changes rotation start timing of a photosensitive member on which the toner image of the predetermined single color is to be formed.

5. An apparatus according to claim 1, wherein said image forming unit includes a photosensitive member and a plurality of image forming portions for forming a toner image on the photosensitive member, and said change unit changes rotation start timing of the photosensitive member.

6. An apparatus according to claim 1, wherein the predetermined single color is achromatic color.

7. An apparatus according to claim 1, wherein said image forming unit includes a conveyance unit for conveying the recording material toward said fixing unit, and said change unit changes actuation timing of said conveyance unit depending on a detection temperature of said fixing unit.

8. An apparatus according to claim 1, wherein said fixing unit is kept at different temperatures between the case of forming the toner image of the plurality of colors and the case of forming the toner image of the predetermined single color.

*9. An image forming apparatus comprising:*

*image forming means, including a plurality of image bearing members, capable of forming a full-color image and a monochromatic image on a recording material;*

*fixing means for fixing the image on the recording material by heating the image at a preset temperature;*

*temperature detecting means for detecting a temperature of said fixing means;*

*temperature control means for controlling the temperature of said fixing means on the basis of an output of said temperature detecting means;*

*image formation control means for controlling said image forming means so as to start an image forming step of forming, when an image forming signal is input, the image on at least one of the image bearing members on the basis of the input image forming signal after a pre-process is performed;*

*actuation means for actuating said image forming means so that (1) in a case that an image forming signal of a full-color image forming mode is input, the pre-process is started when the detected temperature reaches a first pre-process start temperature and the image forming step is started when the detected temperature reaches a first toner image fixing temperature, and (2) in a case that an image forming signal of a monochromatic image forming mode is input, the pre-process is started when the detected temperature reaches a second pre-process start temperature, which is higher than the first pre-process start temperature, and the image forming step is started when the detected temperature reaches a second toner image fixing temperature, which is lower than the first toner image fixing temperature; and*

*change means for changing the first pre-process start temperature, the first toner image fixing temperature, the second pre-process start temperature, and the second toner image fixing temperature,*

*wherein the first pre-process start temperature is lower than the first toner image fixing temperature, and the second pre-process start temperature is lower than the second toner image fixing temperature.*

*10. An apparatus according to claim 9, further comprising change means for changing the first pre-process start temperature or the second pre-process start temperature depending on the detected temperature during the input of the image forming signal so that the first pre-process start temperature or the second pre-process start temperature is lower with a higher detected temperature during the input of the image forming signal.*

*11. An apparatus according to claim 9, further comprising change means for changing the first toner image fixing temperature or the second toner image fixing temperature depending on the detected temperature during the input of the first toner image forming signal so that the first toner image fixing temperature or the second toner image fixing temperature is lower with a higher detected temperature during the input of the image forming signal.*

*12. An apparatus according to claim 9, further comprising change means for changing the first pre-process start temperature or the second pre-process start temperature depending on an image heating temperature so that the first pre-process start temperature or the second pre-process start temperature is higher with a higher image heating temperature.*

*13. An apparatus according to claim 9, further comprising change means for changing the first toner image fixing temperature or the second toner image fixing temperature depending on an image heating temperature so that the first toner image fixing temperature or the second toner image fixing temperature is lower with a higher image heating temperature.*

*14. An apparatus according to claim 9, further comprising change means for changing the first pre-process start temperature or the second pre-process start temperature depending on an image forming speed so that the first pre-process start temperature or the second pre-process start temperature is higher with a higher image forming speed.*

*15. An apparatus according to claim 9, further comprising change means for changing the first toner image fixing tem-*

*perature or the second toner image fixing temperature depending on an image forming speed so that the first toner image fixing temperature or the second toner image fixing temperature is higher with a higher image forming speed.*

*16. An apparatus according to claim 9, wherein the first toner image fixing temperature at which a toner image is fixed on the recording material in the case of the full-color image forming mode is equal to the second toner image fixing temperature at which a toner image is fixed on the recording material in the case of the monochromatic image forming mode.*

*17. An apparatus according to claim 9, wherein the first toner image fixing temperature at which a toner image is fixed on the recording material in the case of the full-color image forming mode is higher than the second toner image fixing temperature at which a toner image is fixed on the recording material in the case of the monochromatic image forming mode.*

*18. An image forming apparatus comprising:*

*image forming means, including a plurality of image bearing members, capable of forming a full-color image and a monochromatic image on a recording material;*

*fixing means for fixing the image on the recording material by heating the image at a preset temperature;*

*temperature detecting means for detecting a temperature of said fixing means;*

*temperature control means for controlling the temperature of said fixing means on the basis of an output of said temperature detecting means;*

*image formation control means for controlling said image forming means so as to start an image forming step of forming, when an image forming signal is input, the image on at least one of the image bearing members on the basis of the input image forming signal after a pre-process is performed;*

*actuation means for actuating said image forming means so that (1) in a case that an image forming signal of a full-color image forming mode is input, the pre-process is started when the detected temperature reaches a first pre-process start temperature and the image forming step is started when the detected temperature reaches a first toner image fixing temperature, and (2) in a case that an image forming signal of a monochromatic image forming mode is input, the pre-process is started when the detected temperature reaches a second pre-process start temperature and the image forming step is started when the detected temperature reaches a second toner image fixing temperature, which is higher than the first toner image fixing temperature; and*

*change means for changing the first toner image fixing temperature and the second toner image fixing temperature,*

*wherein the first and second pre-process start temperatures are lower than the first toner image fixing temperature and the second toner image fixing temperature.*

*19. An apparatus according to claim 18, wherein the first toner image fixing temperature at which a toner image is fixed on the recording material in the case of the full-color image forming mode is equal to the second toner image fixing temperature at which a toner image is fixed on the recording material in the case of the monochromatic image forming mode.*

*20. An apparatus according to claim 18, wherein the first toner image fixing temperature at which a toner image is fixed on the recording material in the case of the full-color image forming mode is higher than the second toner image fixing temperature at which a toner image is fixed on the recording material in the case of the monochromatic image forming mode.*

*21. An image forming apparatus comprising:*

*an image forming device configured to form a monochromatic toner image on a recording material in a monochromatic mode and a full-color toner image on the recording material in a full-color mode;*

*a fixing device configured to fix the toner image on the recording material;*

*a temperature detector configured to detect a temperature of said fixing device;*

*a temperature controller configured to control the temperature of said fixing device based on an output of said temperature detector, said temperature controller raising the temperature of said fixing device up to a target temperature in the monochromatic mode and the full-color mode when an image formation is started; and*

*an actuation controller configured to actuate said image forming device before the temperature of said fixing device reaches the target temperature,*

*wherein said actuation controller starts an actuation of said image forming device when the detected temperature of said fixing device reaches a first temperature in the full-color mode, and starts an actuation of said image forming device when the detected temperature of said fixing device reaches a second temperature, which is higher than the first temperature, in the monochromatic mode.*

*22. An apparatus according to claim 21, wherein said image forming device includes a plurality of photosensitive members, and said actuation controller controls a rotation start timing, as an actuation start timing, of said photosensitive members.*

*23. An apparatus according to claim 21, wherein said image forming device includes a single photosensitive member and a plurality of developing devices, and said actuation controller controls a rotation start timing, as an actuation start timing, of said single photosensitive member.*

*24. An apparatus according to claim 21, wherein said fixing device includes an endless belt configured to heat the toner image on the recording material in a nip portion.*

*25. An apparatus according to claim 24, wherein said fixing device includes a heating member configured to heat the toner image on the recording material through said endless belt in the nip portion.*

*26. An apparatus according to claim 22, wherein said image forming device includes an intermediary transfer member,*

*wherein in the monochromatic mode, the monochromatic toner image is formed on said intermediary transfer member by one of said photosensitive members, and then the monochromatic toner image on said intermediary transfer member is transferred to the recording material, and*

*wherein in the full-color mode, the full-color toner image is formed on said intermediary transfer member by said photosensitive members, and then the full-color toner image on said intermediary transfer member is transferred to the recording material.*

*27. An image forming apparatus comprising:*

*an image forming device configured to form a monochromatic toner image on a recording material in a monochromatic mode and a full-color toner image on the recording material in a full-color mode;*

*a fixing device configured to fix the toner image on the recording material;*

*a temperature detector configured to detect a temperature of said fixing device;*

*a temperature controller configured to control the temperature of said fixing device based on an output of said temperature detector, said temperature controller raising the temperature of said fixing device up to respective target temperatures in the monochromatic mode and the full-color mode when an image formation is started; and*

*an actuation controller configured to actuate said image forming device before the temperature of said fixing device reaches the respective target temperatures,*

*wherein said actuation controller starts an actuation of said image forming device when the detected temperature of said fixing device reaches a first temperature in the full-color mode, and starts an actuation of said image forming device when the detected temperature of said fixing device reaches a second temperature, which is higher than the first temperature, in the monochromatic mode.*

*28. An apparatus according to claim 27, wherein said image forming device includes a plurality of photosensitive members, said actuation controller controls a rotation start timing, as an actuation start timing, of said photosensitive members.*

*29. An appaatus according to claim 27, wherein said image forming device includes a single photosensitive member and a plurality of developing devices, and said actuation controller controls a rotation start timing, as an actuation start timing, of said single photosensitive member.*

*30. An apparatus according to claim 27, wherein the target temperature of said fixing device in the full-color mode is higher than the target temperature of said fixing device in the monochromatic mode.*

*31. An apparatus according to claim 27, wherein said fixing device includes an endless belt configured to heat the toner image on the recording material in a nip portion.*

*32. An apparatus according to claim 31, wherein said fixing device includes a heating member configured to heat the toner image on the recording material through said endless belt in the nip portion.*

*33. An apparatus according to claim 28, wherein said image forming device includes an intermediary transfer member,*

*wherein in the monochromatic mode, the monochromatic toner image is formed on said intermediary transfer member by one of said photosensitive members, and then the monochromatic toner image on said intermediary transfer member is transferred to the recording material, and*

*wherein in the full-color mode, the full-color toner image is formed on said intermediary transfer member by said photosensitive members, and then the full-color toner image on said intermediary transfer member is transferred to the recording material.*

*34. An image forming apparatus comprising:*

*four image forming units configured to form a yellow toner image, a magenta toner image, a cyan toner image and a black toner image, respectively;*

*an intermediary transfer member configured to receive (i) a full-color image including the yellow toner image, the magenta toner image, the cyan toner image and the black toner image transferred from said four image forming units to transfer the full-color image onto a recording material in a full-color mode, and (ii) a monochromatic image including the black toner image transferred from one of said four image forming units to transfer the monochromatic image on the recording material in a monochromatic mode;*

*a fixing device configured to (i) fix the full-color image on the recording material in the full-color mode, and (ii) fix the monochromatic image on the recording material in the monochromatic mode;*

*a temperature detecting portion configured to detect a temperature of said fixing device;*

*a temperature controlling portion configured to control the temperature of said fixing device based on an output of said temperature detecting portion, said temperature controlling portion raising the temperature of said fixing device up to a target temperature in the full-color mode and the monochromatic mode when an image formation is started; and*

*an actuation controlling portion configured to actuate said four image forming units before the temperature of said fixing device reaches the target temperature,*

*wherein said one of said four image forming units is disposed at a most downstream position relative to the other three image forming units in a moving direction of said intermediary transfer member, and*

*wherein said actuation controlling portion starts an actuation of said four image forming units when the detected temperature of said fixing device reaches a first temperature in the full-color mode, and starts an actuation of one of said four image forming units when the detected temperature of said fixing device reaches a second temperature, which is higher than the first temperature, in the monochromatic mode.*

*35. An apparatus according to claim 34, wherein said fixing device includes an endless belt configured to heat the toner image on the recording material in a nip portion.*

*36. An apparatus according to claim 35, wherein said fixing device includes a heating member configured to heat the toner image on the recording material through said endless belt in the nip portion.*

*37. An apparatus according to claim 35, wherein said temperature detecting portion detects a temperature of said endless belt as the temperature of said fixing device.*

*38. An apparatus according to claim 34, wherein said fixing device includes a roller configured to heat the toner image on the recording material in a nip portion.*

*39. An apparatus according to claim 38, wherein said temperature detecting portion detects a temperature of said roller as the temperature of said fixing device.*

*40. An image forming apparatus comprising:*

*a first image forming unit, provided with a first photosensitive member, configured to form a yellow toner image on said first photosensitive member;*

*a second image forming unit, provided with a second photosensitive member, configured to form a magenta toner image on said second photosensitive member;*

*a third image forming unit, provided with a third photosensitive member, configured to form a cyan toner image on said third photosensitive member;*

*a fourth image forming unit, provided with a fourth photosensitive member, configured to form a black toner image on said fourth photosensitive member;*

*an intermediary transfer member configured to receive (i) a full-color image including the yellow toner image, the magenta toner image, the cyan toner image and the black toner image transferred from said first, second, third and fourth photosensitive members to transfer the full-color image onto a recording material in a full-color mode, and (ii) a monochromatic image including the black toner image transferred from said fourth photo-*

*sensitive member to transfer the monochromatic image on the recording material in a monochromatic mode;*

*a fixing device configured to (i) fix the full-color image on the recording material in the full-color mode, and (ii) fix the monochromatic image on the recording material in the monochromatic mode;*

*a temperature detecting portion configured to detect a temperature of said fixing device;*

*a temperature controlling portion configured to control the temperature of said fixing device based on an output of said temperature detecting portion, said temperature controlling portion raising the temperature of said fixing device up to a target temperature in the full-color mode and the monochromatic mode when an image formation is started; and*

*an actuation controlling portion configured to actuate said first, second, third and fourth photosensitive members before the temperature of said fixing device reaches the target temperature,*

*wherein said fourth photosensitive member is disposed at a most downstream position relative to said first, second, and third photosensitive members in a moving direction of said intermediary transfer member, and*

*wherein said actuation controlling portion starts rotation of said first, second, third and fourth photosensitive members when the detected temperature of said fixing device reaches a first temperature in the full-color mode, and starts rotation of said fourth photosensitive member when the detected temperature of said fixing device reaches a second temperature, which is higher than the first temperature, in the monochromatic mode.*

*41. An apparatus according to claim 40, wherein said fixing device includes an endless belt configured to heat the toner image on the recording material in a nip portion.*

*42. An apparatus according to claim 41, wherein said fixing device includes a heating member configured to heat the toner image on the recording material through said endless belt in the nip portion.*

*43. An apparatus according to claim 41, wherein said temperature detecting portion detects a temperature of said endless belt as the temperature of said fixing device.*

*44. An apparatus according to claim 40, wherein said fixing device includes a roller configured to heat the toner image on the recording material in a nip portion.*

*45. An apparatus according to claim 44, wherein said temperature detecting portion detects a temperature of said roller as the temperature of said fixing device.*

*46. An image forming apparatus comprising:*

*four image forming units configured to form a yellow toner image, a magenta toner image, a cyan toner image and a black toner image, respectively;*

*an intermediary transfer member configured to receive (i) a full-color image including the yellow toner image, the magenta toner image, the cyan toner image and the black toner image transferred from said four image forming units to transfer the full-color image onto a recording material in a full-color mode, and (ii) a monochromatic image including the black toner image transferred from one of said four image forming units to transfer the monochromatic image on the recording material in a monochromatic mode;*

*a fixing device configured to (i) fix the full-color image on the recording material in the full-color mode, and (ii) fix the monochromatic image on the recording material in the monochromatic mode;*

*a temperature detecting portion configured to detect a temperature of said fixing device;*

*a temperature controlling portion configured to control the temperature of said fixing device based on an output of said temperature detecting portion, said temperature controlling portion raising the temperature of said fixing device up to respective target temperatures in the full-color mode and the monochromatic mode when an image formation is started; and*

*an actuation controlling portion configured to actuate said four image forming units before the temperature of said fixing device reaches the respective target temperature,*

*wherein said one of said four image forming units is disposed at a most downstream position relative to the other three image forming units in a moving direction of said intermediary transfer member, and*

*wherein said actuation controlling portion starts an actuation of said four image forming units when the detected temperature of said fixing device reaches a first temperature in the full-color mode, and starts an actuation of one of said four image forming units when the detected temperature of said fixing device reaches a second temperature, which is higher than the first temperature, in the monochromatic mode.*

*47. An apparatus according to claim 46, wherein said fixing device includes an endless belt configured to heat the toner image on the recording material in a nip portion.*

*48. An apparatus according to claim 47, wherein said fixing device includes a heating member configured to heat the toner image on the recording material through said endless belt in the nip portion.*

*49. An apparatus according to claim 47, wherein said temperature detecting portion detects a temperature of said endless belt as the temperature of said fixing device.*

*50. An apparatus according to claim 46, wherein said fixing device includes a roller configured to heat the toner image on the recording material in a nip portion.*

*51. An apparatus according to claim 50, wherein said temperature detecting portion detects a temperature of said roller as the temperature of said fixing device.*

*52. An image forming apparatus comprising:*

*a first image forming unit, provided with a first photosensitive member, configured to form a yellow toner image on said first photosensitive member;*

*a second image forming unit, provided with a second photosensitive member, configured to form a magenta toner image on said second photosensitive member;*

*a third image forming unit, provided with a third photosensitive member, configured to form a cyan toner image on said third photosensitive member;*

*a fourth image forming unit, provided with a fourth photosensitive member, configured to form a black toner image on said fourth photosensitive member;*

*an intermediary transfer member configured to receive (i) a full-color image including the yellow toner image, the magenta toner image, the cyan toner image and the black toner image transferred from said first, second, third and fourth photosensitive members to transfer the full-color image onto a recording material in a full-color mode, and (ii) a monochromatic image including the black toner image transferred from said fourth photosensitive member to transfer the monochromatic image on the recording material in a monochromatic mode;*

*a fixing device configured to (i) fix the full-color image on the recording material in the full-color mode, and (ii) fix the monochromatic image on the recording material in the monochromatic mode;*

*a temperature detecting portion configured to detect a temperature of said fixing device;*

*a temperature controlling portion configured to control the temperature of said fixing device based on an output of said temperature detecting portion, said temperature controlling portion raising the temperature of said fixing device up to respective target temperatures in the full-color mode and the monochromatic mode when an image formation is started; and*

*an actuation controlling portion configured to actuate said first, second, third and fourth photosensitive members before the temperature of said fixing device reaches the respective target temperature,*

*wherein said fourth photosensitive member is disposed at a most downstream position relative to said first, second, and third photosensitive members in a moving direction of said intermediary transfer member, and*

*wherein said actuation controlling portion starts rotation of said first, second, third and fourth photosensitive members when the detected temperature of said fixing device reaches a first temperature in the full-color mode, and starts rotation of said fourth photosensitive member when the detected temperature of said fixing device reaches a second temperature, which is higher than the first temperature, in the monochromatic mode.*

*53. An apparatus according to claim 52, wherein said fixing device includes an endless belt configured to heat the toner image on the recording material in a nip portion.*

*54. An apparatus according to claim 53, wherein said fixing device includes a heating member configured to heat the toner image on the recording material through said endless belt in the nip portion.*

*55. An apparatus according to claim 53, wherein said temperature detecting portion detects a temperature of said endless belt as the temperature of said fixing device.*

*56. An apparatus according to claim 52, wherein said fixing device includes a roller configured to heat the toner image on the recording material in a nip portion.*

*57. An apparatus according to claim 56, wherein said temperature detecting portion detects a temperature of said roller as the temperature of said fixing device.*

* * * * *